US012304637B2

(12) United States Patent
Scotford et al.

(10) Patent No.: US 12,304,637 B2
(45) Date of Patent: *May 20, 2025

(54) DUAL OPERATION EMERGENCY PASSAGE EGRESS SYSTEM

(71) Applicant: Adient Aerospace, LLC, Bothell, WA (US)

(72) Inventors: Timothy Scotford, Monmouthshire (GB); Paul Morgan, Nantyglo (GB); Robert Raikes, Newport (GB); Paul Edwards, Nantyglo (GB)

(73) Assignee: Adient Aerospace, LLC, Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,180

(22) Filed: Oct. 31, 2023

(65) Prior Publication Data

US 2024/0101258 A1 Mar. 28, 2024

Related U.S. Application Data

(63) Continuation of application No. 17/738,657, filed on May 6, 2022, now Pat. No. 11,905,020.

(51) Int. Cl.
 *B64D 11/06* (2006.01)
 *E05D 15/06* (2006.01)
(52) U.S. Cl.
 CPC ...... *B64D 11/0606* (2014.12); *E05D 15/0652* (2013.01); *E05Y 2800/246* (2013.01); *E05Y 2900/502* (2013.01); *E05Y 2900/531* (2013.01)
(58) Field of Classification Search
 None
 See application file for complete search history.

(56) References Cited

U.S. PATENT DOCUMENTS

2021/0179254 A1* 6/2021 Scotford ............ E05D 15/0652

FOREIGN PATENT DOCUMENTS

| WO | 2021084249 A1 | 5/2021 |
| WO | 2021084470 A1 | 5/2021 |
| WO | 2021136935 A1 | 7/2021 |

OTHER PUBLICATIONS

Extended European Search Report for Application No. 23162603.7, dated Sep. 29, 2023, 10 pages.

* cited by examiner

*Primary Examiner* — Marcus Menezes
(74) *Attorney, Agent, or Firm* — Yee & Associates, P.C.

(57) ABSTRACT

Examples provide a door assembly including a dual operation slide device for a sliding privacy door associated with a seat unit. The door assembly includes a sliding door movably mounted to a door support member of a seat unit. The door slides laterally between a retracted position and a deployed or partially deployed position. The dual operation slide device includes a trigger and release mechanism for switching the door assembly from a primary track system used during a normal operation mode to a secondary track system used during a backup operation mode if the primary track becomes jammed or otherwise malfunctions based on manual activation of a release lever or force applied activation. The dual operation slide device enables a user to return the sliding door to a retracted position after a failure of the primary slide units to operate in the normal operational mode.

20 Claims, 29 Drawing Sheets

DUAL OPERATION EMERGENCY PASSAGE EGRESS SYSTEM

CROSS REFERENCE TO RELATED APPLICATIONS

The present application is a Continuation of U.S. application Ser. No. 17/738,657 filed on May 6, 2022, now U.S. Pat. No. 11,905,020, issued Feb. 20, 2024, the entire disclosure of which is hereby incorporated by reference herein.

BACKGROUND

Sliding privacy doors are sometimes provided on seats within a vehicle, such as passenger seats in the cabins of aircraft and other types of passenger transportation vehicles. These sliding privacy doors may include screen doors and/or sliding partitions dividing one passenger seat from other passenger seats and/or closing off a seat access point adjacent to the aisle of the vehicle cabin. These types of privacy doors can typically slide from an open or retracted position to a deployed (closed) position providing privacy for the passenger seated in the passenger seat.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations. Nor is it intended to identify key features or essential features of the claimed subject matter, nor is it intended to be used as an aid in determining the scope of the claimed subject matter.

Some aspects and implementations disclosed herein are directed to a dual-operation sliding door assembly for emergency passage egress. A seat unit includes a door support member and a primary track mounted to a sliding door. The sliding door is movable along the primary track between a retracted position and at least one deployed position in a normal operation mode via a carriage device at least partially disposed within the primary track.

A dual operation slide device is at least partially disposed within the door support member. The dual operation slide device automatically releases the carriage device from an immovable carriage station and onto a secondary track in a backup operation mode. The released carriage device is movable along the secondary track from the deployed position back to a retracted position. The dual operation slide device includes a carriage release mechanism that triggers release of the carriage device from the carriage station when a release lever is actuated. The dual operation slide device also includes an automatic release mechanism that releases the carriage device from the carriage station in response to a force applied to a mechanical fuse assembly. The mechanical fuse assembly triggers the release of the carriage device from the carriage station in response to a threshold amount of force applied to the sliding door in a direction of the door support member.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
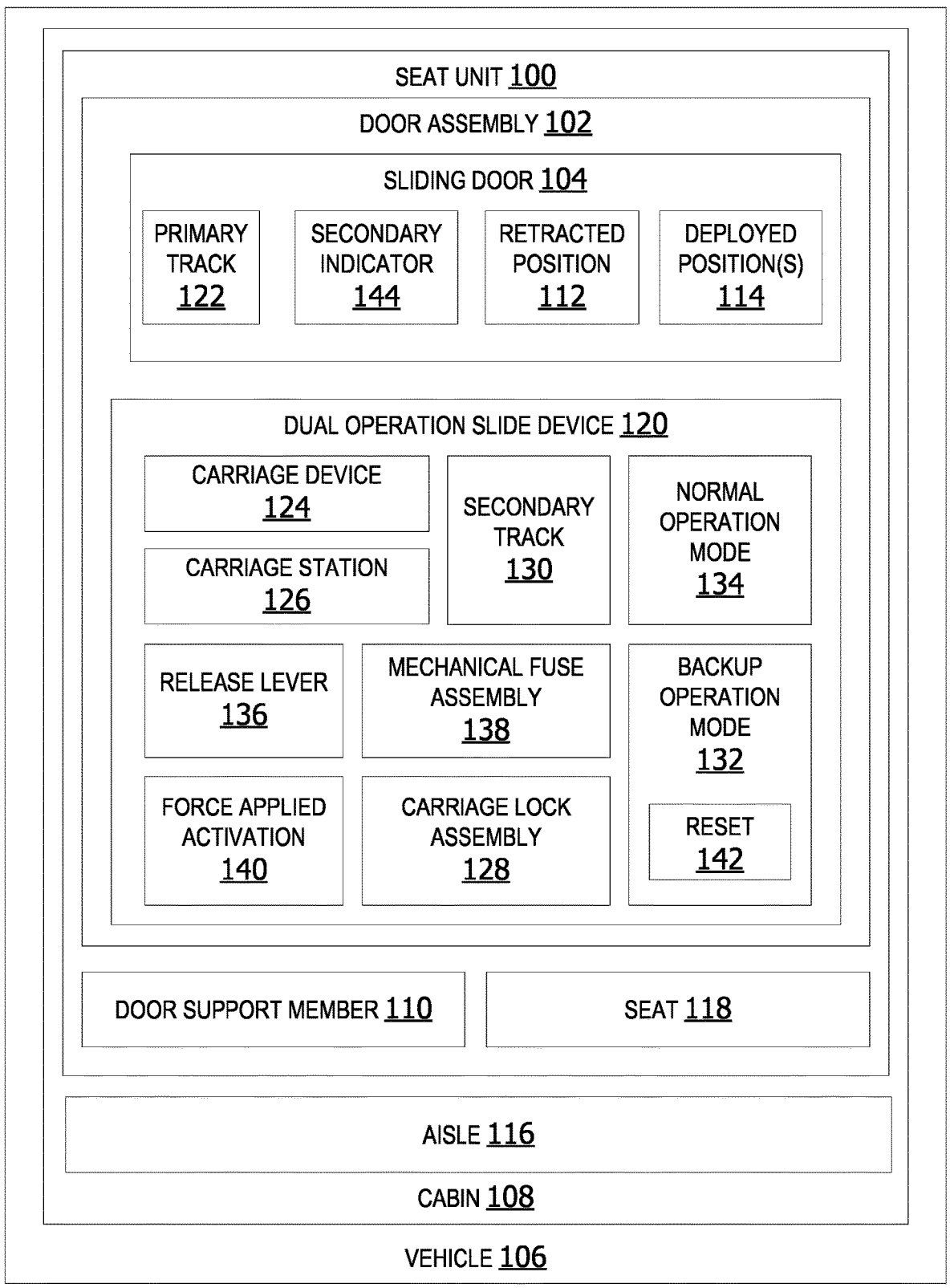
FIG. 1 is an exemplary block diagram illustrating a seat unit having a dual operation sliding door assembly.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

A door assembly associated with a seat unit for utilization within a vehicle cabin that includes a privacy door or other type of slidable screen or partition in vehicles, such as aircraft, can become inoperable due to damage, improper use, a maintenance issue, a jammed track, or other issue. If the door becomes inoperable in the deployed position, a user may be unable to move the door back into a retracted position. An immovable door in such cases can block passenger access paths, obstruct movement of passengers and crew, and otherwise impede egress from the vehicle. It may be possible to manually remove the jammed door or step over it if the privacy door is not too tall, but these solutions are cumbersome, inconvenient, and potentially creates obstacles for users. Moreover, if the door is manually disassembled or forcibly moved, it may further damage the seat unit and/or result in the door falling into an aisle or other space between seats impeding the passenger's ability to move freely within a vehicle cabin.

Frangible panels and removable doors can be used in some cases. However, erroneous activation of the backup operation mode with these systems could result in a loss of privacy features for passengers during the duration of travel, entail extensive and time-consuming maintenance to reset and/or may be difficult to accomplish by crew in a high stress situation in which a user's instinctive physical efforts may be to use greater force to move a jammed door rather than attempt to locate, read and follow potentially complex instructions associated with removing or otherwise detaching a door from the seat unit furniture. Moreover, such measures may negatively impact passenger and crew movements as well as affect egress from the suite.

Thus, aspects of the disclosure provide an improved door assembly for a seat unit provided within a vehicle cabin, such as an aircraft cabin. In case of an emergency, a malfunction case or a jammed (immobilized) door in a deployed or partially deployed position, the door can easily be opened or closed by actuating a decoupling lever to switch the sliding door from the jammed primary track to a backup secondary track, thereby enabling the jammed door to be moved from the deployed position to a retracted position in which passenger access areas are unobstructed safely without repairs, removing the door from the door support member and without using any tools.

In other examples, the dual operation slide device enables the sliding door to be switched from the primary track to the secondary track via actuation of a latch. The latch is provided on an interior side of the door support member and is easily accessible to the passenger seated in the seat associated with the seat unit. This enables quick and efficient switching from the normal operation mode to the backup operation mode in which the sliding door slides along the secondary track.

In still other examples, the dual operation slide device automatically switches from the primary track to the secondary track in response to a force applied activation of the dual operation slide device. In other words, if the primary track becomes jammed and a threshold force is applied to the handle of the sliding door, applied on the back of the sliding door or applied to any other portion of the sliding door in a direction towards the door support member, such as when a user is attempting to open (retract) the door, an automatic release mechanism releases a sliding carriage device from an immovable carriage station and onto the secondary track enabling the door to slide in the backup operation mode without a latch. In these examples, the dual operation slide device operates with or without a release lever. In some examples, the extent to which the door retracts while in the backup operation mode depends on the position of the door between the fully open and closed positions. In one example, the secondary track length provides a fifteen inch minimum opening when malfunction occurs at the door fully closed position.

Referring to the figures, examples of the disclosure provide a dual operation slide device enabling a sliding door to be released from a carriage station on a door support member of a seat unit and switched to a secondary track when a primary track becomes jammed or otherwise non-operational. The door is then moved from the fully deployed position or partially deployed position back into the retracted position via the secondary track. This enables a quick and efficient disengagement mechanism for returning the sliding door to the retracted position without completely detaching the sliding door from the door support member. This permits the user to move the door into a desired open position for user access to a cabin aisle or other area outside the seat unit.

In other examples, a reset is provided that enables the carriage device to be reset back into the carriage station such that the sliding door returns to sliding along the primary track rather than the secondary track. This automatic reset restores the sliding door to normal operation mode without any tools, disassembly or repair for improved user safety and convenience.

Other aspects provide a set of guides on the sliding door that engage channels on the door support member. When the sliding door is detached from the slide unit, an auxiliary slide device including at least one guide and at least one guide profile supports the weight of the sliding door and maintains the door in an upright configuration relative to the aisle and passenger seating area. This improves user safety and ensures smooth operation of the sliding door in the backup operation mode.

Referring more particularly to the drawings, FIG. 1 provides an exemplary block diagram illustrating a passenger seat unit 100 for a passenger. In some examples, the seat unit 100 includes a door assembly 102 including a sliding door 104.

In some examples, the sliding door 104 is any type of door element within a vehicle 106 of cabin 108, such as a door, screen, partition, or other panel that slides from an open position (retracted) to a closed position (deployed) to provide privacy to a passenger, shield the passenger from lights in the cabin 108, muffle sounds from other passengers and/or crew or otherwise enable the passenger to relax during travel, such as during a flight on an aircraft. The sliding door 104 may also be referred to as a door, door unit, door element or privacy door.

For example, in the retracted position the sliding door 104 is in a stowed and opened state such that a seat arranged adjacent the door assembly is accessible for a passenger and visible to a crew member. In this example, the sliding door 104 is optionally locked in the retracted position, such as during taxi, take-off and landing of the aircraft or during emergency situations. The retracted position includes a fully retracted position as well as a partially or substantially retracted position in which the door has retracted far enough to permit user ingress and egress from the seating area.

During flight, the sliding door 104 is unlocked, whereby a passenger is allowed to move the sliding door 104 from the fully or partially retracted position to any deployed position or partially deployed position to cover or partially block the view to a portion of seating area of the passenger for improved privacy and convenience. For instance, the sliding door 104 is deployed forward to provide passenger privacy while sleeping, eating, reading or any other time the passenger desires privacy. The sliding door is deployed or partially deployed when the door is partially extended or fully extended away from the door support member. A deployed position can also be described as a closed position or extended position.

The vehicle 106 is a vehicle for transporting one or more users from a first location to a second location. The vehicle 106 can include any type of vehicle, such as, but not limited to, an aircraft, boat, ship, space liner, bus, or any other type of vehicle. In this non-limiting example, the vehicle is an aircraft. An aircraft can include a commercial airplane, a private airplane, a hover craft, a seaplane, or any other type of aircraft.

In some examples, the door assembly 102 of the seat unit 100 within the vehicle 106 also includes a door support member 110 and the sliding door 104 is movably mounted to the door support member 110. The door support member is part of the furniture fixture that makes up the seat unit.

The sliding door 104 is movable between a fully retracted position 112 and one or more deployed position(s) 114. The fully retracted position 112 is an open state of the door in which the sliding door is overlapping the door support member such that passenger access to the area in and around the passenger seat 118 and egress out of the seat area into the aisle 116 is unobstructed. The one or more deployed position(s) 114 include a fully deployed position or various partially deployed positions. For example, the sliding door 104 can be deployed to a half-way point, deployed three-fourths of the way to the fully deployed (closed door) position, deployed to a position one-fourth of the way from the retracted position, etc.

A dual operation slide device 120, in this example, is disposed on or within the door support member 110 to movably support the sliding door 104 on the door support member 110. In some examples, a primary track 122 is mounted on the sliding door 104. In this example, the primary track is mounted to an interior side of the sliding door such that it is not visible from the exterior side of the sliding door facing out into the aisle 116 of the vehicle 106. The primary track 122 in this example is mounted to an upper area of the interior surface of the door, near the top edge of the door. A carriage device 124 includes a set of rollers or sliders that fit within the primary track or otherwise slidably connects to the primary track and enables the sliding door to slide laterally along left and right via the carriage device in the normal operation mode.

An underside of the carriage device removably attaches or otherwise locks into a carriage station 126. The carriage station is immovably mounted to the door support member 110. The carriage device is at least partially disposed within the primary track. In the normal operation mode 134, the primary track on the sliding door glides or otherwise slides over the rollers on the carriage device as the door moves side-to-side between the retracted and deployed positions. The carriage device remains in a stationary position locked into place by a carriage lock assembly 128.

If the primary track becomes jammed or otherwise ceases to operate normally preventing the sliding door 104 from returning to the retracted position, the dual operation slide device 120 automatically releases the carriage device 124 from the carriage station onto a secondary track 130 in a backup operation mode 132. The released carriage device 124 is movable along the secondary track 130 from the at least one deployed position 114 to the retracted position 112.

In some examples, the dual operation slide device 120 includes a release lever 136. The release lever 136 is actuated by a user to trigger the carriage lock assembly 128 to release the carriage device 124 from the carriage station 126. When released, the carriage device 124 slides along the secondary track 130. The secondary track 130 is mounted to an interior surface of the door support member 110 or mounted within a portion of an interior of the door support member 110, such that the secondary track is not visible to the passenger seated in the seat 118 associated with the seat unit 100.

In other examples, the user triggers the system to automatically switch from the normal operational mode 134 to the backup operation mode 132 by applying a threshold amount of force to the back of the sliding door 104, pushing the door towards the retracted position. In other words, the user pushes the door towards the door support member 110 when the door is in the fully or partially deployed position with the primary track jammed, and the mechanical fuse assembly 138 is automatically triggered to release of the carriage device from the carriage station. The sliding door then slides along the secondary track back to the retracted position 112.

When the carriage device is locked into the carriage station, the sliding door slides along the primary track in a lateral side-to-side motion from the retracted position to the fully deployed position in the normal operation mode 134. When the carriage device is de-coupled from carriage station, the carriage device slides along the secondary track 130 in the same lateral side-to-side motion from the fully or partially deployed position back to the retracted position in the backup operation mode 132.

As used herein, the seat unit 100 refers to the furniture, structure, fixtures, base and/or other support members associated with a passenger seat 118. The seat unit 100 can include, for example, but without limitation, the seat 118 for a single passenger to sit on, a console, a back wall panel, a side wall panel, a sliding door, an access space/path enabling passenger ingress and egress from the seat and/or seating area around the seat, cup holders, a tray table, a display screen/video screen, footrest, back rest, head rest, or any other seat-related devices. In this example, the seat unit 100 includes door assembly 102, a passenger seat, such as the seat 118, a base member, a back member, a console and/or an access area enabling the passenger to move from an aisle 116 of the vehicle cabin 108 into the seating area associated with the seat unit 100. The passenger seat is optionally a static seat, a reclining seat, or any other type of seat.

In some examples, the door is substantially adjacent to the door support member in the fully deployed mode. The door support member is substantially covered by the door when the door is positioned in the retracted position. Likewise, the door partially overlaps the door support member and partially protrudes beyond the door support member into an access space of the seat unit when the door is in the partially deployed position.

In the example of FIG. 1, the dual operation slide device includes both the release lever 136 and the force applied activation 140 via the mechanical fuse assembly 138. However, in other examples, the door assembly 102 does not include the release lever 136. In these examples, the dual operation slide device switches from the primary track to the secondary track in response to application of the threshold amount of force applied to the back of the door in the direction of the door support member. In still other example, the door assembly includes the release lever 136 that is utilized to activate the carriage lock assembly to release the carriage device from the carriage station in case of the primary track becoming jammed but does not include the force applied activation of the backup operation mode 132.

In yet other examples, after activation of the backup operation mode via actuation of the release lever 136, the system can be reset 142 by applying a threshold amount of force to pull the door back towards the fully deployed position 114. As the user pushes the door, the carriage device slides back into the carriage station forcing the carriage release mechanism to reset 142, locking the carriage device back into the carriage station. Once reset, the sliding door returns to operating in the normal operation mode 134.

The sliding door 104 optionally includes a secondary indicator 144 indicating the sliding door 104 is in a backup operation mode 132. In some examples, the release lever 136 remains in an activated/pulled state indicating the door in in the backup operation mode. The secondary indicator 144 provides an additional indicator on the exterior (aisle-facing) side of the sliding door notifying users that the sliding door is in the backup operation mode. In other examples, the system does not include the release lever. In these examples, the secondary indicator 144 provides the only visual, tactile, or auditory indication that the door is operating in the backup mode using the secondary track. The secondary indicator 144 can be implemented as a pop-out button on the exterior (aisle-facing) side of the door, a light indicator, an audible indicator which emits a sound, a digital indicator having a display screen displaying a text or graphic indicator that the door is in the backup mode or any other type of indicator. In this example, the secondary indicator 144 is a pop-out button which remains flush with the door or recessed within the door while the door operates in normal mode. When the door operates in the backup mode, the button pops-out to provide a visible indication of the door operating in backup mode.

In some examples, the carriage station 126 and the secondary track 130 are two separate components which are joined together via an attachment means, such as, but not limited to, screws, welds, bolts, or other attachment devices. In other examples, the carriage station 126 and the secondary track 130 are implemented as a single (one-piece) device rather than as two separate pieces. In these examples, an attachment device attaching an end of the secondary device to the carriage station is unnecessary.

In the example of FIG. 1, the primary track is mounted to the sliding door and the secondary track is mounted to the door support member. In other examples, the primary track can be mounted to the door support member and the secondary track can be mounted to the sliding door.

Figure 2:
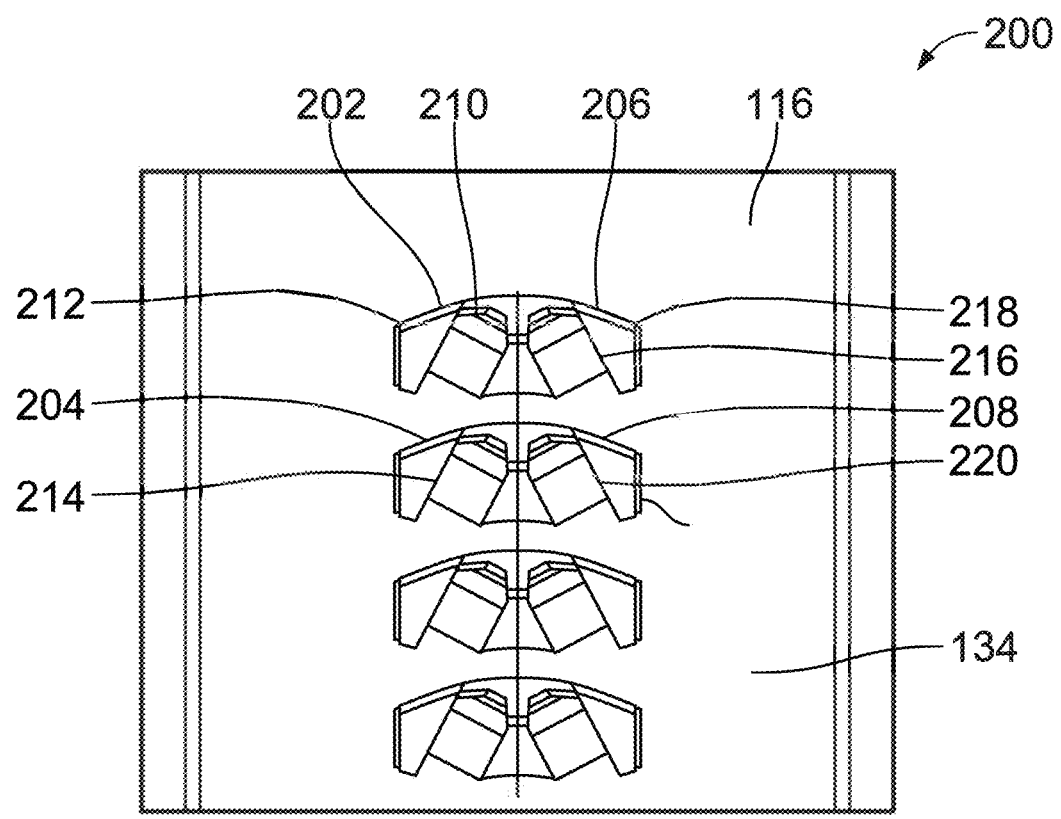
FIG. 2 is an exemplary schematic diagram illustrating a top view of a passenger seating arrangement.

FIG. 2 is an exemplary schematic diagram illustrating a top view of a passenger seating arrangement 200 including seat units having sliding doors, such as, but not limited to, the seat unit 100 in FIG. 1 above. In this example, the passenger seating arrangement (SA) 200 is arranged within a vehicle cabin 108, in particular an aircraft cabin or other passenger transportation vehicle. The passenger SA 200 includes a plurality of seat units arranged within the vehicle cabin, such as, for example, the seat unit 202, seat unit 204, seat unit 206 and/or seat unit 208. The seat unit 202, seat unit 204, seat unit 206 and/or seat unit 208 are units for supporting a passenger seat, a door support member, and a sliding door, such as, but not limited to, the seat unit 100 in FIG. 1.

In this example, the seat units are positioned in rows of two seats per row with each row arranged one behind another along a longitudinal extension direction of the vehicle cabin. However, the examples are not limited to seat units arranged in linear rows with only two seats per row. In other examples, seats can be placed in rows having three or more seats. Likewise, the seat units can be placed in other arrangements not shown in FIG. 2.

Each seat unit includes a seat, a door support member, and a sliding door, such as, but not limited to, the sliding door 104 in FIG. 1. For example, seat unit 202 includes seat 210 and door support member 212; seat unit 204 includes seat 214; seat unit 206 includes seat 216 and door support member 218; and seat unit 208 includes seat 220. Each sliding door is configured to at least partially block or close-off a passenger access to the corresponding seat providing more privacy to the corresponding passenger. In some examples, the sliding door associated with the seat unit 208 at least partially blocks an ingress/egress area between seat 220 and the cabin aisle 116 when the sliding door is in the deployed or partially deployed position.

In some non-limiting examples, a door assembly for a given seat unit is disposed on a side of the seat unit facing the cabin aisle 116. For example, in the fully or partially retracted position, the sliding door for the seat unit 204 is in a stowed and opened state such that the passenger access provides egress from or ingress to the seat unit 208. In the deployed position (not shown), more privacy is provided to the passenger seated on the seat 220, as the seat 220 is at least partially covered from view by the deployed door. However, the examples are not limited to the sliding door disposed on a side of the seat unit adjacent to the aisle. In other examples, the door is attached to a door support member on a side of the seat unit facing or adjacent to another passenger seat. In still other examples, the sliding door is attached to a side of the seat unit near the aisle or any other walkway, access way, stairway, exit door (point of ingress or egress), or other traffic area.

Figure 3:
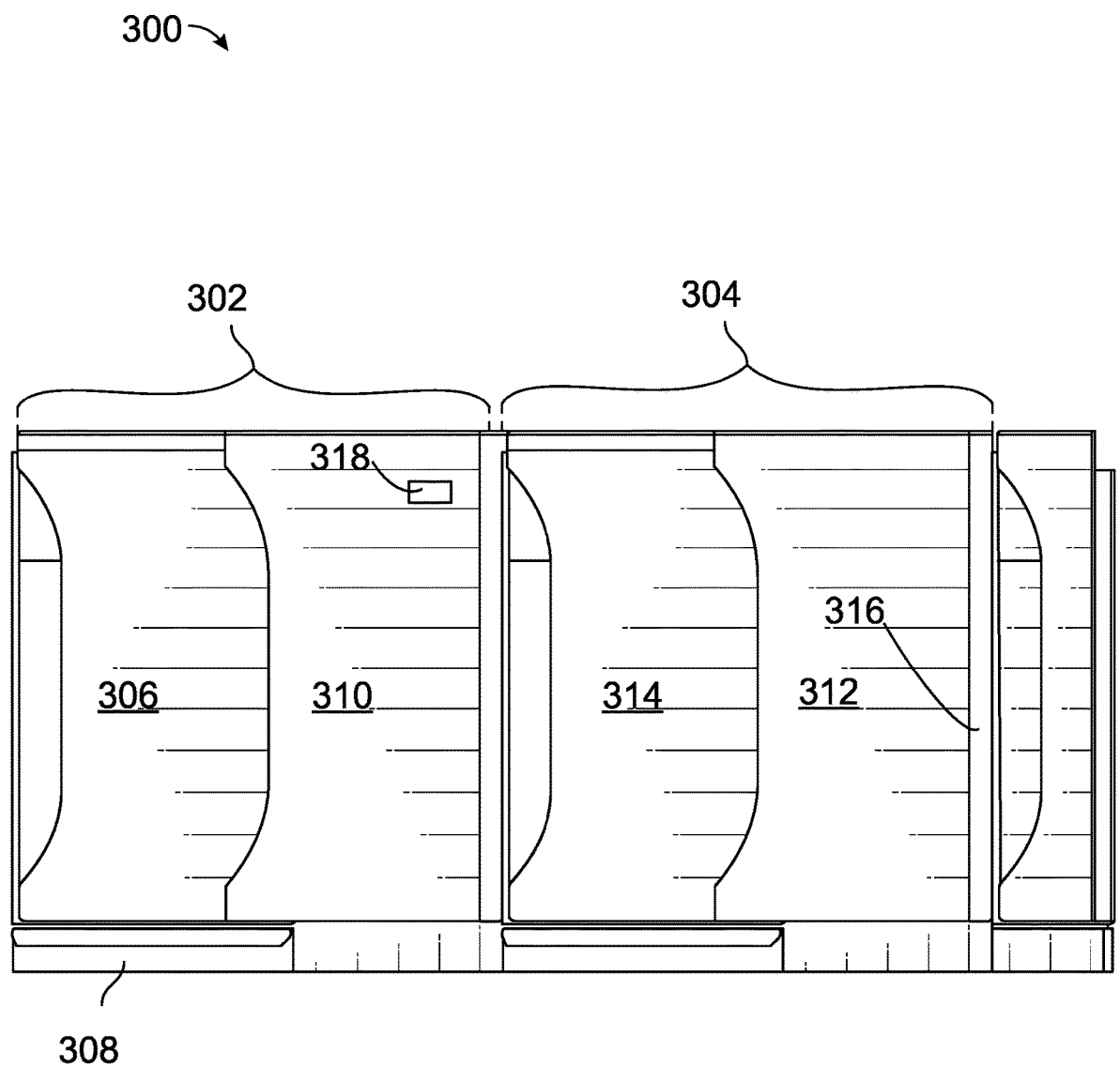
FIG. 3 is an exemplary schematic diagram illustrating a side view of a passenger seating arrangement including seat units having sliding doors in a fully deployed position.

Turning now to FIG. 3, an exemplary schematic diagram illustrating a side view of a passenger seating arrangement 300 including seat units having sliding doors in a fully deployed position is depicted. The passenger seating arrangement 300 includes one or more seat units having sliding doors, such as, but not limited to, the passenger SA 200 in FIG. 2. In this example, the passenger SA 300 is arranged within a vehicle cabin, such as an aircraft cabin or other passenger transportation vehicle. In this example, the SA 300 is within a vehicle, such as the vehicle 106 in FIG. 1 shown above.

The passenger SA 300 includes a plurality of seat units arranged within the vehicle cabin, such as, for example, the seat unit 302 and the seat unit 304. The seat unit 302 and the seat unit 304 can support a passenger seat, a door support member, and a sliding door, such as, but not limited to, the seat unit 100 in FIG. 1.

The sliding doors optionally include a secondary indictor, such as the secondary indicator 318 on the sliding door 310. The secondary indicator 318 is a device which activates automatically when the sliding door is in backup operation mode. The secondary indicator 318 is an indicator such as, but not limited to, the secondary indicator 144 in FIG. 1 above.

In this example, the seat units are arranged one behind another along a longitudinal extension direction of the vehicle cabin. However, the examples are not limited to seat units arranged in linear rows. In other examples, the seat units can be placed in other arrangements not shown in FIG. 3.

Each seat unit includes a passenger seat, such as, but not limited to, the seat 118 in FIG. 1. The seat unit 302, in other examples, includes a door support member 306 and/or a base member 308. The door support member 306 can include a dual operation slide device and a secondary track, which can be coupled to a furniture part of the seat unit 302. In this example, the sliding door 310 is mounted to the door support member 306 above the base member 308. The sliding door 310 in this example does not contact the cabin floor.

The sliding door 310 is a door associated with a door assembly, such as, but not limited to, the door assembly 102 in FIG. 2. The sliding door 310 is movable between a retracted position and at least one deployed position. The deployed position of sliding door 310 (not shown) can include a fully deployed position or a partially deployed position in which the door has not been moved to a terminal end stopping point of the primary track, at which point the door has reached maximum extension (fully deployed). In this example, the door 310 associated with the seat unit 302 is shown in the fully deployed (closed) position. The sliding door 312 associated with the seat unit 304 is also shown in a fully deployed position substantially adjacent to the door support member 314. In the fully deployed position, the door 312 may partially overlap a portion of the door support member 314 while leaving the majority of the door support member 314 clear of the door 312.

The sliding door 310 and/or the sliding door 314 are configured for lateral movement into any position between the retracted position and the deployed position. In some examples, the sliding door 310 and/or the sliding door 312 is secured by a user in its retracted position. When the sliding door 310 and/or the sliding door 312 is secured, the sliding door 310 and/or the sliding door 312 optionally remains latched in the retracted position until the door 312 is deployed forward by a passenger of the seat unit 302. In the deployed position, the sliding door 310 and/or the sliding door 312 can remain unlatched. The sliding door 310 is configured to block access at least partially, physically, visually, or both physically and visually, to the seat associated with the seat unit 302 providing more privacy to the corresponding passenger of seat unit 302.

The backup operation mode, in this example, can be engages by manually pulling a release lever located on an interior side of the door support member (behind the sliding door). The backup operation mode in which the sliding door slides along the secondary track can also be engaged by a user apply a threshold force pushing on a back 316 of the sliding door, in a direction toward the door support member 314. In other words, if the door becomes jammed on the primary track, the user can push on the back 316 of the door in a direction the door would slide when returning to the retracted position to engage the backup operation mode switching the dual operation slide device from the primary track to the secondary track automatically without pulling any levers, using any tools or disassembly any parts of the sliding door assembly.

Figure 4:
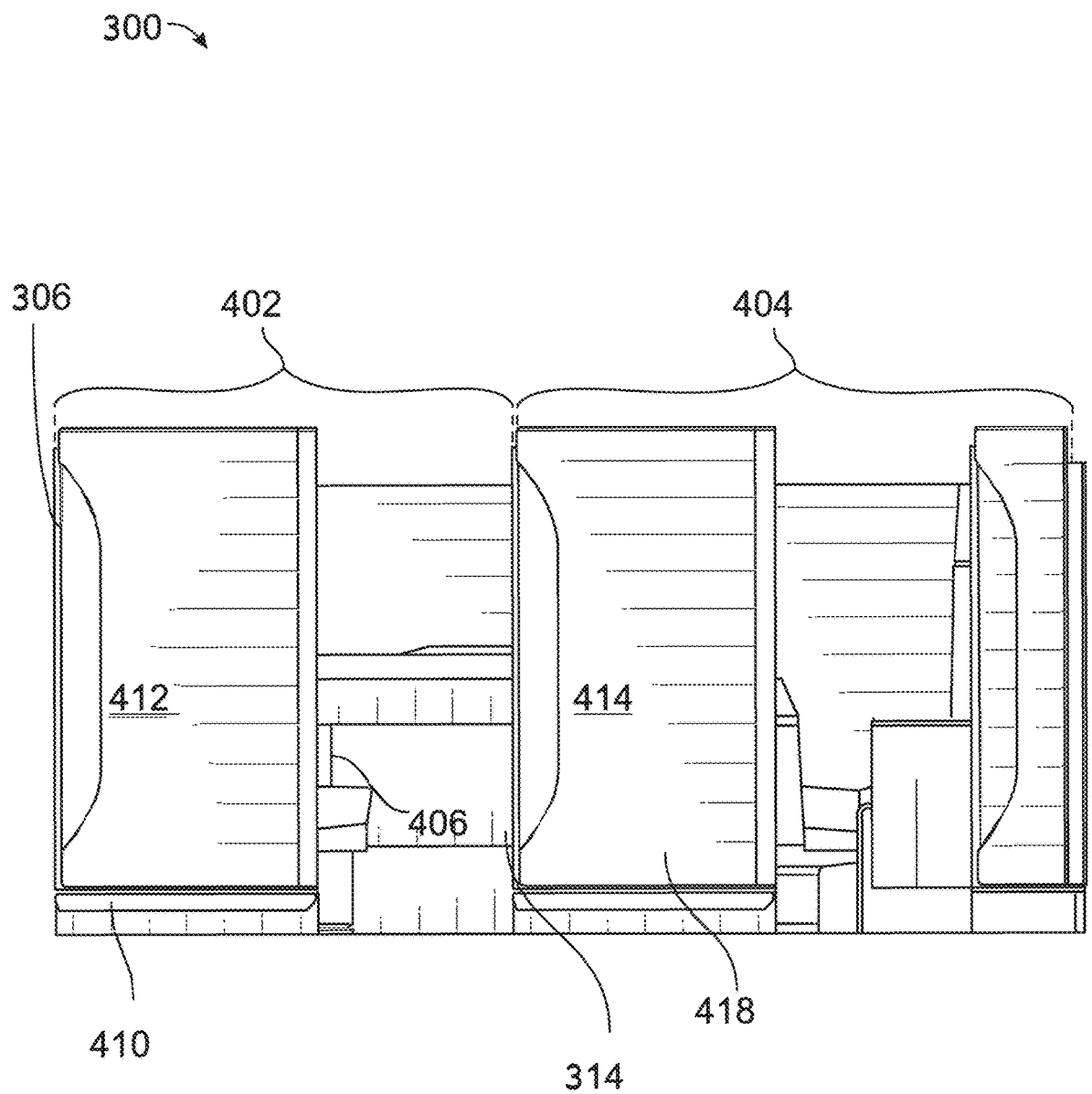
FIG. 4 is an exemplary schematic diagram illustrating a side view of a passenger seating arrangement including seat units having sliding doors in a retracted position.

FIG. 4 is an exemplary schematic diagram illustrating a side view of a passenger seating arrangement (SA) 300 including seat units having sliding doors in a retracted position. The seat units within the passenger SA 300 are shown from a viewpoint of a user in the area of the cabin aisle outside the passenger seat units from an exterior or cabin-facing side of the doors.

The passenger SA 300 includes one or more seat units having sliding doors, such as, but not limited to, the passenger SA 200 in FIG. 2. In this example, the passenger SA 300 is arranged within a vehicle cabin, such as an aircraft cabin or other passenger transportation vehicle. In this example, the SA 300 is within a vehicle, such as the vehicle 106 in FIG. 1 shown above.

The passenger SA 300 includes a plurality of seat units arranged within the vehicle cabin, such as, for example, the seat unit 402 and the seat unit 404. The seat unit 402 and the seat unit 404 can support a passenger seat, a door support member, and a sliding door, such as, but not limited to, the seat unit 100 in FIG. 1. In this example, the seat units are arranged one behind another along a longitudinal extension direction of the vehicle cabin. However, the examples are not limited to seat units arranged in linear rows. In other examples, the seat units can be placed in other arrangements not shown in FIG. 4.

Each seat unit includes a passenger seat, such as the seat 406 associated with the seat unit 402. The seat 406 is a passenger seat, such as, but not limited to, the seat 118 in FIG. 1. The seat can include a static seat which does not move and/or a reclining seat. The seat 406 optionally can include a reclining back piece, a footrest and/or arm rests.

The seat unit 402, in other examples, includes a door support member 306. The seat unit 402 optionally includes a base member 410. The door support member 306 can include a primary track, a carriage station contact point, a primary track terminal end, and/or a wall or other support structure(s), which can be coupled to a furniture part, the seat 406 and/or a cabin floor structure. In this example, the sliding door 412 removably engages the primary track mounted to the door support member 306. The sliding door 412 in some examples, hangs above the base member 410 and does not contact the cabin floor.

The sliding door 412 is a door associated with a door assembly, such as, but not limited to, the door assembly 102 in FIG. 2. The sliding door 412 is movable between a retracted position and at least one deployed position. In this example, the door 412 associated with the seat unit 402 and the door 414 associated with seat unit 404 are both shown in the retracted position. In this example, the sliding door 414 exterior side 418 is shown. The exterior side of the sliding door is the aisle-facing side of the sliding door that is visible to users in the aisle of the vehicle outside the seating area.

The door 412 in the retracted position overlaps the door support member 306 such that it almost completely overlaps the door support member 306. Likewise, the door 414 in this example is overlapping a majority of the exterior surface of the door support member 314 such that the door 414 covers a majority of the exterior surface of the door support member.

The sliding door 412 in this example is a privacy door or screen element which deploys forward and stows aft by means of a dual operation slide device, such as the dual operation slide device 120 in FIG. 1. The sliding door 412 may be implemented as a solid door, a mesh door, a screen door, or any other type of sliding door.

In an event the primary track malfunctions or becomes jammed, for example during an emergency situation or an accidental damaging of the sliding door, the sliding door 412 may become stuck in one of its deployed positions such that the sliding door ceases to move relative to the door support member. In such cases, the dual operation slide device enables the sliding door carriage device to switch from sliding along the primary track to sliding along the secondary track by decoupling from the carriage station. Decoupling the carriage device from the carriage station enables the sliding door to be moved from the deployed position to the retracted position to provide an egress path for the passenger when the primary slide unit is nonoperational or failing to operate as intended.

In this example, the retracted position is the maximum retraction possible for the sliding door 412. A user pulls the door along a lateral line of movement out of the fully stowed position and into a partially deployed or fully deployed position during the normal operational mode. Deploying the sliding door 412 provides at least partial privacy for a user utilizing the seat 406 associated with the seat unit 402.

In other examples, the sliding door 412 is mounted to the door support member 306 and hangs a predetermined distance above the base member 410 without contacting the floor of the vehicle cabin.

The seat unit 402 optionally includes furniture structures, such as, but not limited to, a console, partition, a tray table device, passenger utility device, storage devices, or any other furniture structures. In this example, the one or more optional furniture structures are arranged such that furniture parts at least partially surround the seat 406.

The sliding door 412 can be used in-flight for the convenience of the passenger. In some examples, the sliding door 412 is stowed (fully retracted) and secured during take-off and/or landing to prevent deployment or partial deployment of the sliding door during the take-off and/or landing.

Figure 5:
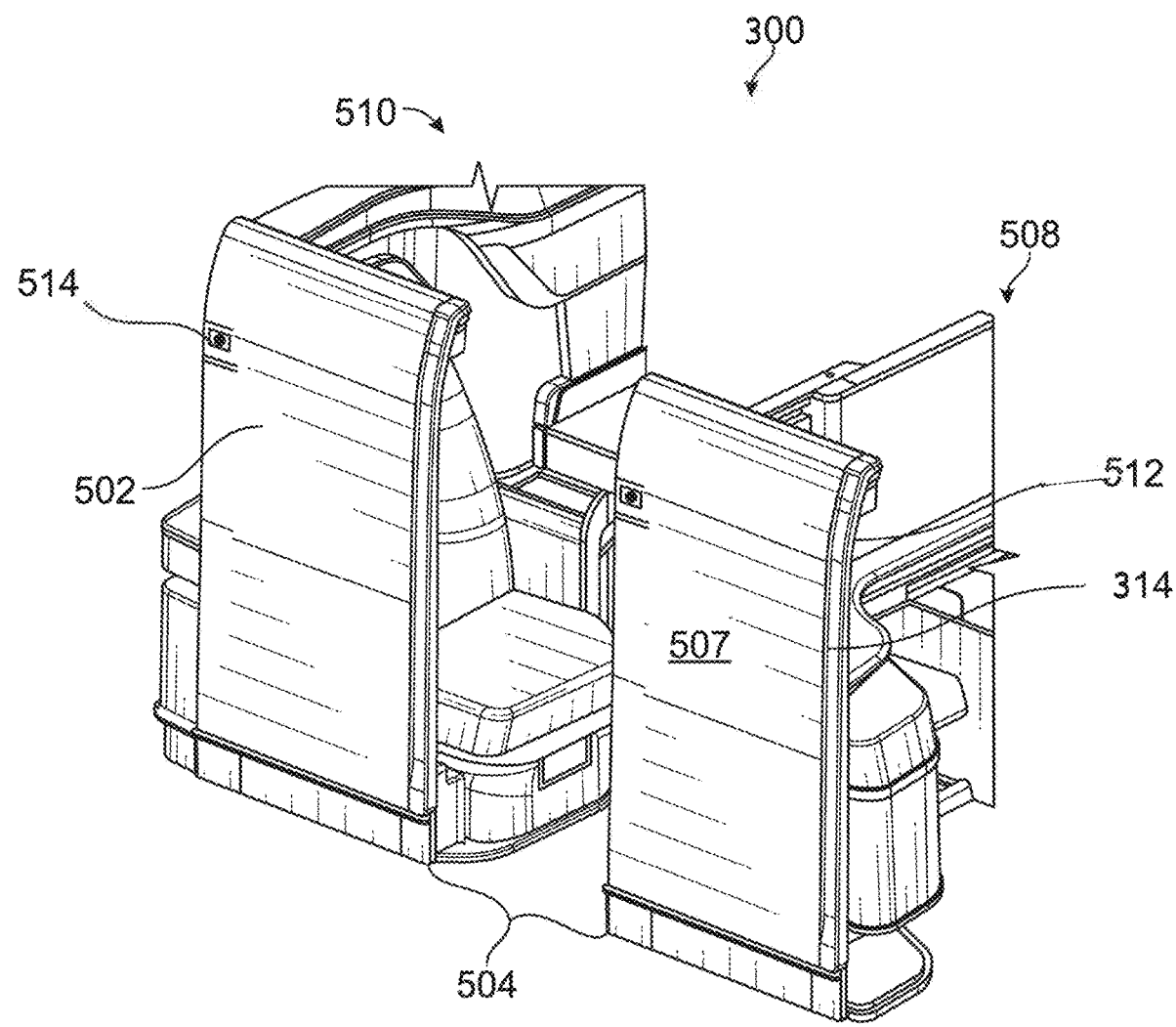
FIG. 5 is an exemplary schematic diagram illustrating a perspective view of a passenger seating arrangement including seat units having sliding doors in a fully deployed position.

FIG. 5 is an exemplary diagram illustrating a perspective view of a passenger seating arrangement 300 including seat units having sliding doors in a fully deployed position. In this example, the sliding door 502 is retracted. There is an opening or gap 504 between the sliding door 502 and a door support member 314 of a next seat unit 508 positioned in front of the seat unit 510 in the seating arrangement 300. In this example, the door support member 314 is partially obscured behind the sliding door 507 which is shown in a retracted position in FIG. 5. A primary track is attached to an interior side 512 of the sliding door. The interior side 512 is a passenger-facing side which is facing the passenger seating area when the sliding door is in the fully deployed position. When retracted, the interior side 512 faces the exterior side of the door support member.

In some examples, the system does not include a release lever. Where the release lever is not included, the system switches from the primary track to the secondary track using the force applied activation. In such cases, a secondary indicator 514 can be included on the aisle-facing (exterior) surface of the door to indicate the backup operation mode is in use. In this example, the secondary indicator 514 is a pop-out button, switch, light, or other indicator that activates when the system is in the backup operation mode. The secondary indicator 514 is an indicator such as, but not limited to, the secondary indicator 144 in FIG. 1 above.

Figure 6:
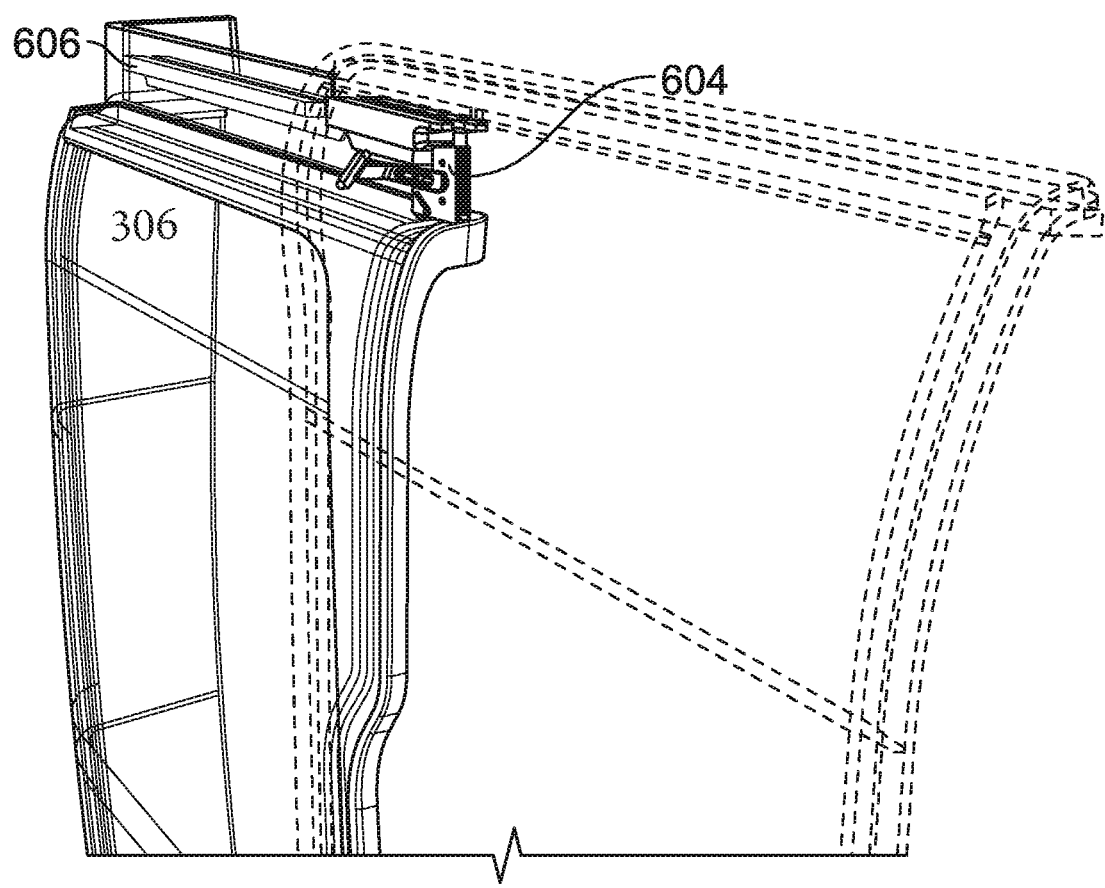
FIG. 6 is an exemplary schematic diagram illustrating a door support member including a dual operation slide device.

Referring now to FIG. 6, an exemplary schematic diagram illustrating a door support member 306 including a dual operation slide device 604 having a secondary track 606 is shown. A door (shown in dash lines) having a primary track located on an interior surface of the door engages a carriage device locked into the carriage station of the dual operation slide device 604. If the primary track becomes jammed while the door is in the fully or partially deployed position, the dual operation slide device 604 releases the carriage device from the carriage station, releasing the door to slide along the secondary track 606. The carriage device slides along the secondary track returning to the retracted position.

Figure 7:
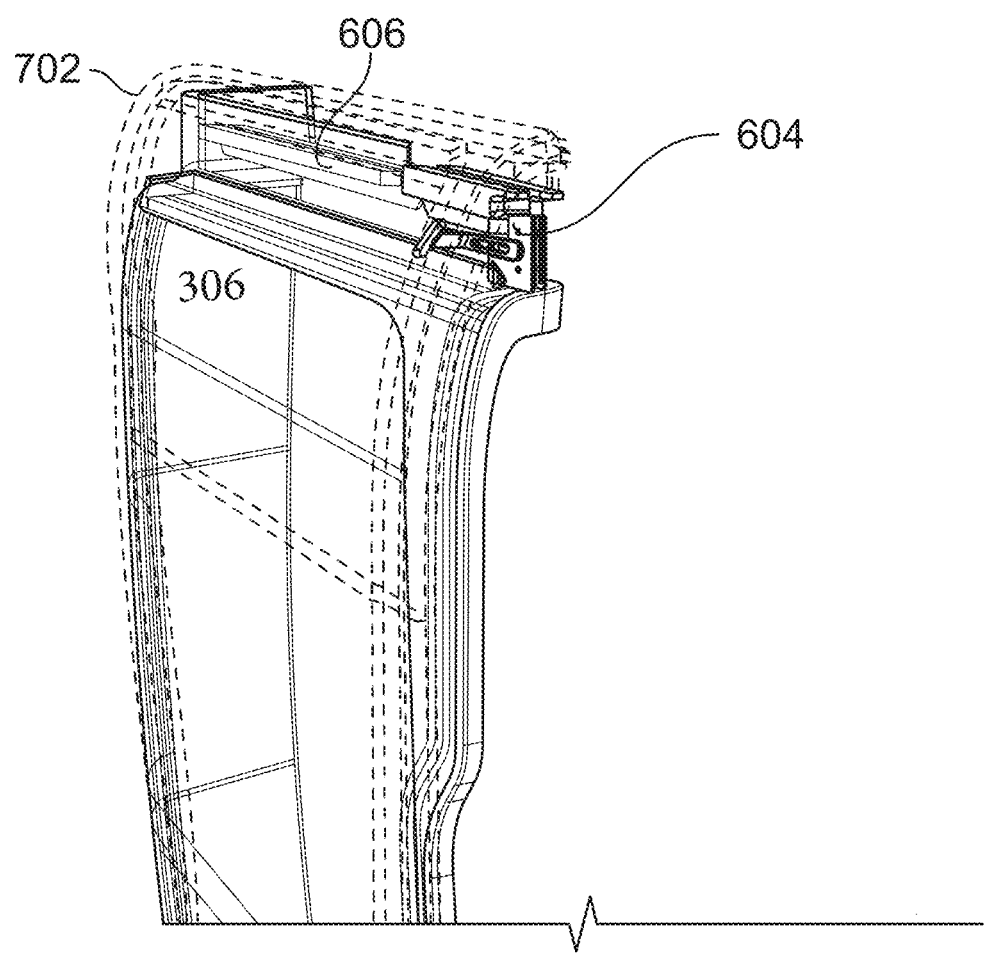
FIG. 7 is an exemplary schematic diagram illustrating a door support member including a dual operation slide device having a secondary track.

FIG. 7 is an exemplary schematic diagram illustrating the door support member 306 including the dual operation slide device 604 having the secondary track 606. Once the door, shown in dash lines, returns to the retracted position 702 along either the primary track or the secondary track, the door partially overlaps the door support member 306.

Figure 8:
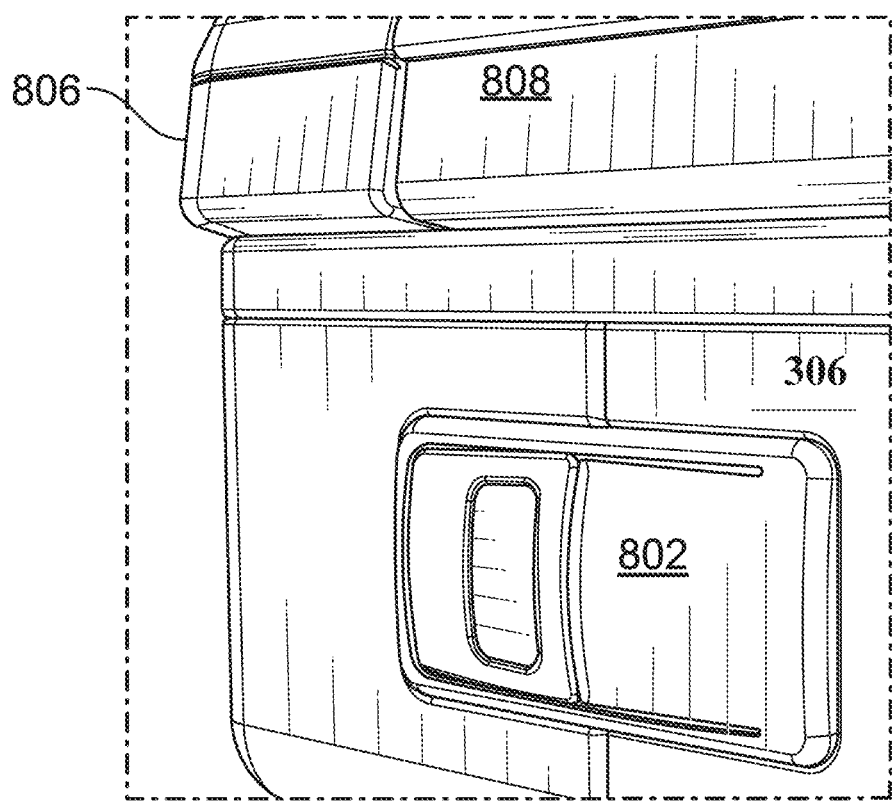
FIG. 8 is an exemplary schematic diagram illustrating a release lever on a door support member in a non-actuated state.

FIG. 8 is an exemplary schematic diagram illustrating a release lever 802 on a door support member 306 in a non-actuated state. In this example, the release lever 802 is located on an interior surface of the door support member facing a passenger seated in a seat associated with the seat unit of the door assembly including the door support member 306. The user pulls the release lever to switch the dual operation slide device from the normal operation mode in which the door slides on the primary track (not shown) located on the top portion 806 of the sliding door.

In this example, the primary track is located behind the top portion 806 of the door 808 which is curling over part of the primary track obscuring it from view by the passenger in the passenger seating area. In other words, the release lever 802 on the door support member is passenger facing, such that the release lever 802 is visible to a passenger sitting in the seat associated with the sliding door but not visible from the aisle. The top portion 806 of the door 808 overlaps the door support member on the aisle side of the door support member. Only the top portion 806 of the door 808 that curls over the top edge of the door support member is visible on the passenger-facing (interior) side of the door support member in this example.

Figure 9:
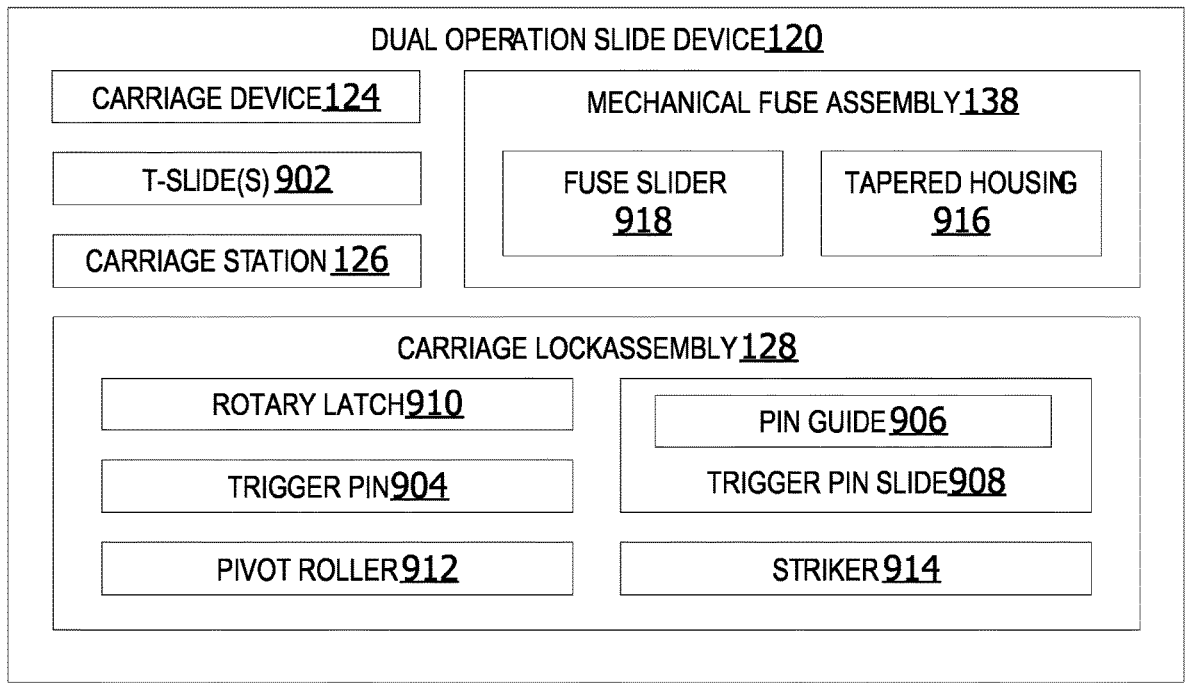
FIG. 9 is a block diagram illustrating a dual operation slide device 120 including a mechanical fuse assembly and a carriage lock assembly.

FIG. 9 is a block diagram illustrating a dual operation slide device 120 including a mechanical fuse assembly 138 and a carriage lock assembly 128. In some examples, the carriage device 124 includes a set of one or more T-slide(s) 902 coupled to a bottom portion of the carriage device 124. The T-slide(s) 902 fit within a portion of the carriage station 126 housing.

The carriage lock assembly 128 is a mechanism for locking the T-slides of the carriage device 124 into the carriage station 126 and/or releasing the T-slide(s) from the carriage device 124 in response to actuation of a decoupling mechanism and/or application of the threshold amount of force on the back of the door while the primary track is malfunctioning.

In some examples, when a user actuates the release lever on the sliding door support member, a trigger pin 904 is pushed up through a pin guide 906 in a trigger pin slide 908 from a first position to a second position. As the trigger pin moves to the second position, it pushes a rotary latch which engages a rotary latch 910. A pivot roller 912 of the rotary latch moves a striker 914 forward and up a tapered housing 916 of the mechanical fuse assembly 138. This causes the carriage lock assembly to drop, releasing the T-slide(s) 902 from the carriage station. Once the T-slides are free, the carriage device 124 is able to slide into the secondary track in the backup operation mode.

In other examples, the dual operation slide device 120 can switch from the normal operation mode to the backup operation mode in response to application of a force on the sliding door. When the primary track is jammed, a force applied to the door is forced onto the fuse slider 918. The force applied on the fuse slider 918 causes a spring to compress pushing the fuse slider forward and down, which frees the T-slide(s) from the carriage station.

Figure 10:
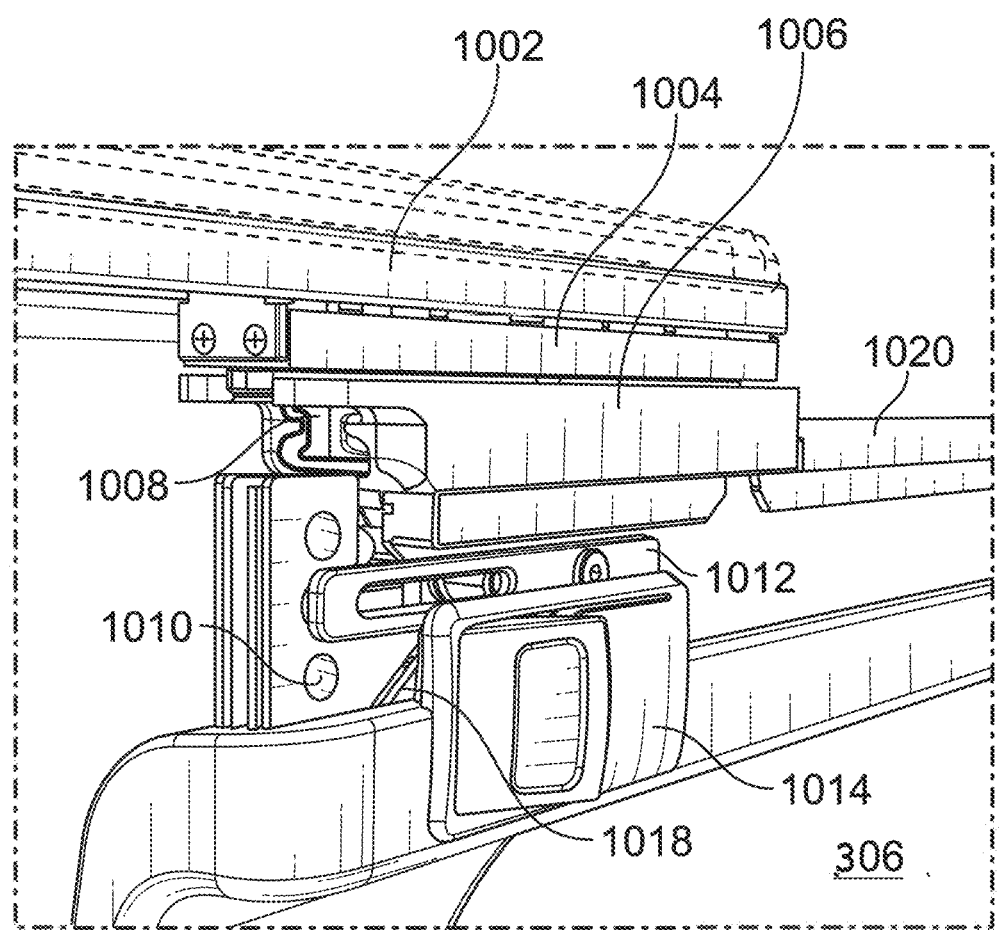
FIG. 10 is an exemplary schematic diagram illustrating a release lever associated with a dual operation slide device in an actuated state.

FIG. 10 is an exemplary schematic diagram illustrating a release lever associated with a dual operation slide device 604 in an actuated state. In this example, a primary track 1002 is coupled to the sliding door, shown in dash lines. The primary track 1002 is mounted to an interior side of the sliding door, facing the door support member when the sliding door is in a fully retracted or partially retracted position. In this example, the top portion of the sliding door, shown in dash lines, curls or curves slightly over the primary track forming a small ledge, lip, cover, or short canopy over the primary track.

A carriage device 1004 engages the primary track 1002. In this example, the carriage device 1004 includes a set of rollers, wheels, bearings, or other track engagement units which fit within at least a portion of the primary track enabling the primary track of the door to slide smoothly over the stationary carriage device 1004 as the door moves between the retracted and deployed positions. The carriage device 1004 is stationary in a fixed position on the door support member 306 while it is locked into the carriage station in the normal operation mode.

In some examples, when the release lever 1014 is activated, a trigger pin 1018 is moved from a first position to a second position, which triggers a rotary latch 1010 to move the carriage lock assembly forward and down, releasing the T-slide(s) 1008 from the carriage station 1006. Once freed, the carriage device 1004 is able to slide along the secondary track 1020 towards the retracted position in the backup operation mode.

In this example, the dual operation slide device operated by the release lever triggers the carriage device release. The release lever locks in the pulled state, as shown in FIG. 10, providing a visual feedback of the backup operation mode engaged by the pulled latch. This carriage lock release mechanism allows the sliding door to open and be retained on the seat unit structure by the secondary (redundant) slide.

Figure 11:
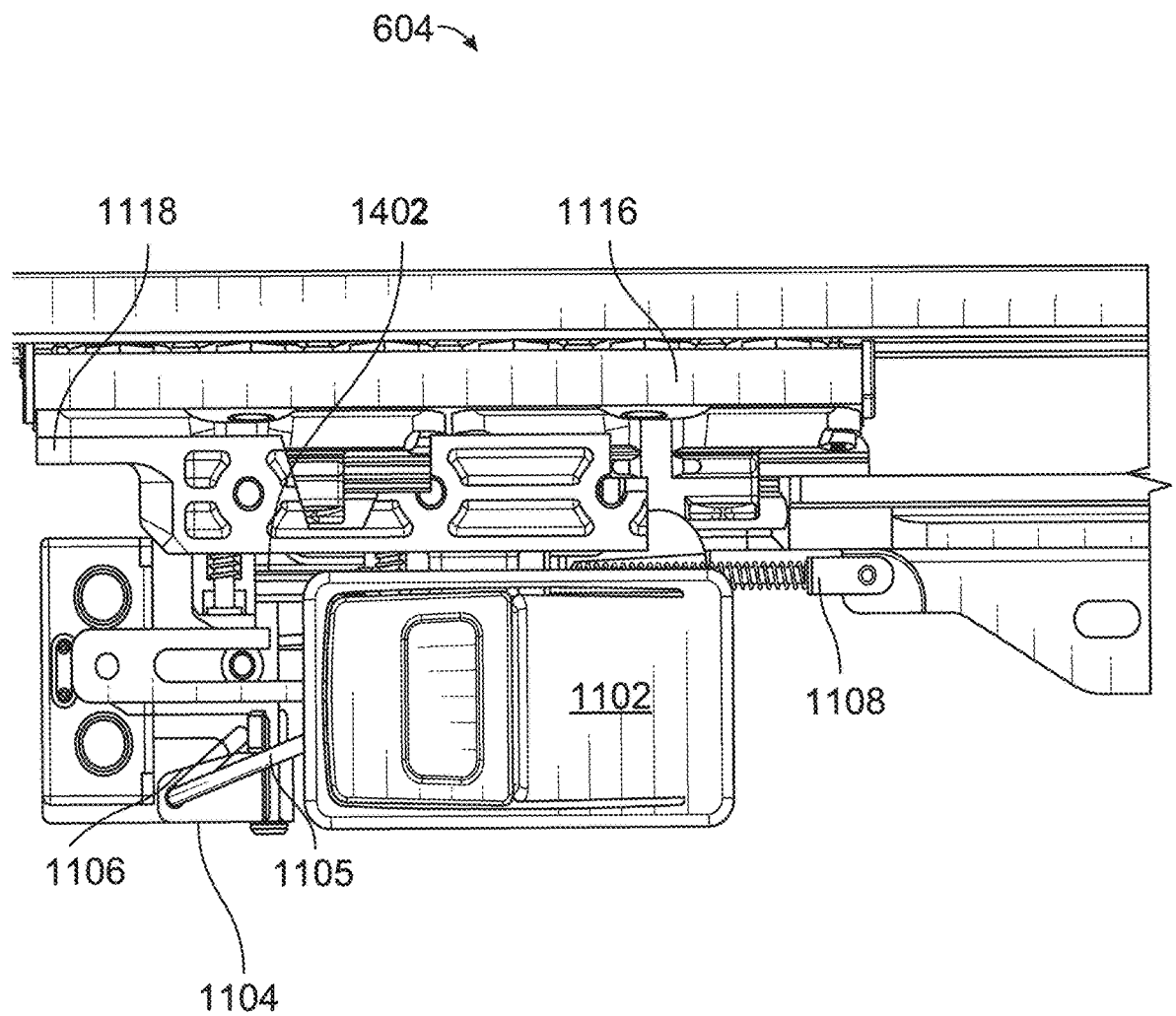
FIG. 11 is an exemplary schematic diagram illustrating a dual operation slide device in a normal operation mode.

FIG. 11 is an exemplary schematic diagram illustrating a dual operation slide device 604 in a normal operation mode. In this example, the release lever 1102 is in a de-activated state indicating the release lever has not been manually actuated by a user. A trigger pin 1105 is in a first position within a pin guide 1104 of the trigger pin slide 1106. A spring 1108 of the mechanical fuse assembly is in an uncompressed state. The carriage device 1116 in this example is locked into the carriage station 1118.

Figure 12:
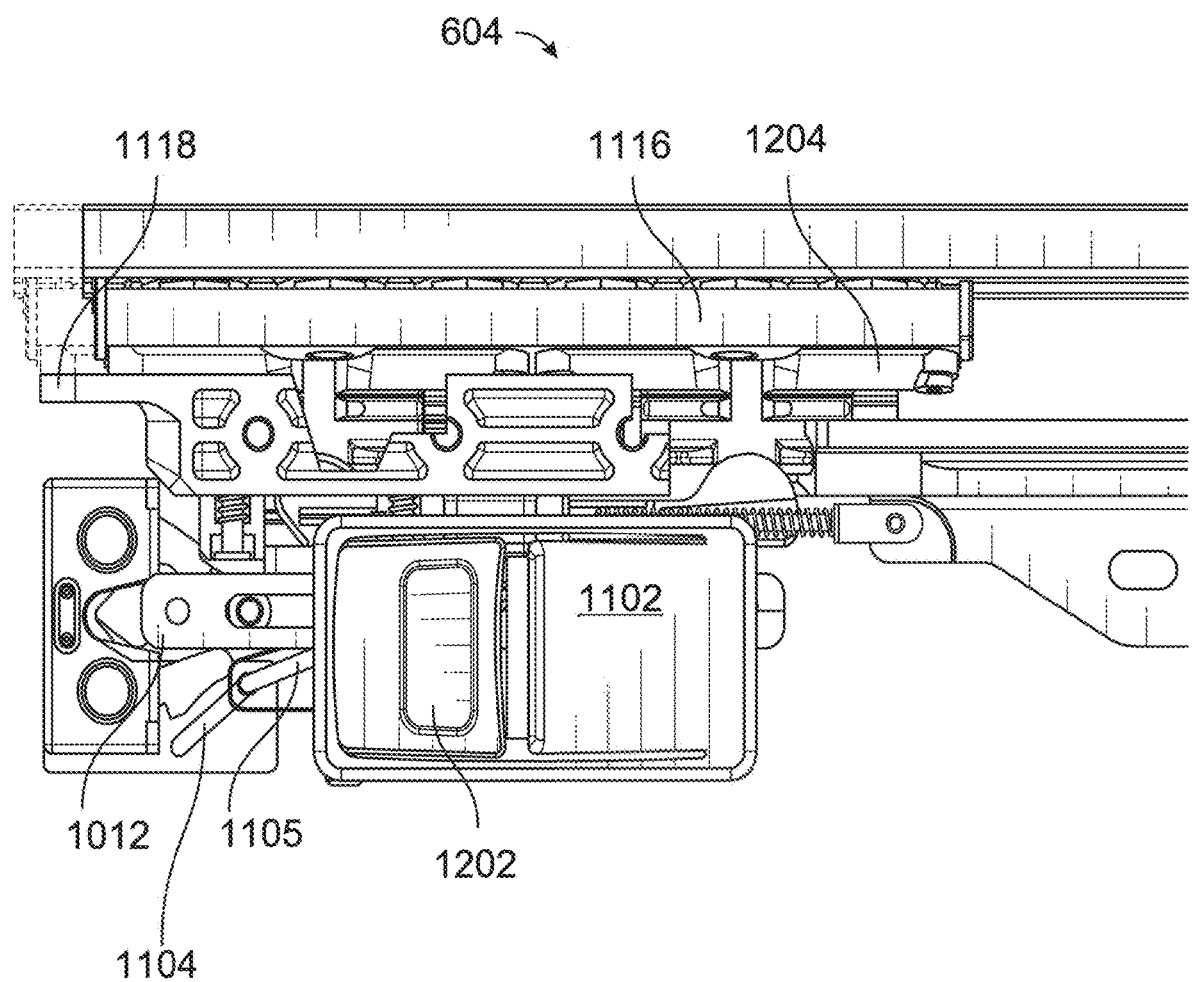
FIG. 12 is an exemplary schematic diagram illustrating a dual operation slide device having a release lever actuated to trigger the backup operation mode.

Turning now to FIG. 12, an exemplary schematic diagram illustrating a dual operation slide device 604 having a release lever actuated to trigger the backup operation mode is shown. In this example, the release lever 1102 has been manually actuated. The release lever 1102 remains in the "pulled" configuration with the release lever 1202 extending outward indicating the release lever has been actuated. Pulling the release lever 1102 pushes the trigger pin 1105 into the second position within the pin guide 1104. The carriage lock assembly 1012 slides forward. The carriage device 1116 begins to slide forward as the T-slider(s) 1204 are released from the carriage housing 1118.

Figure 13:
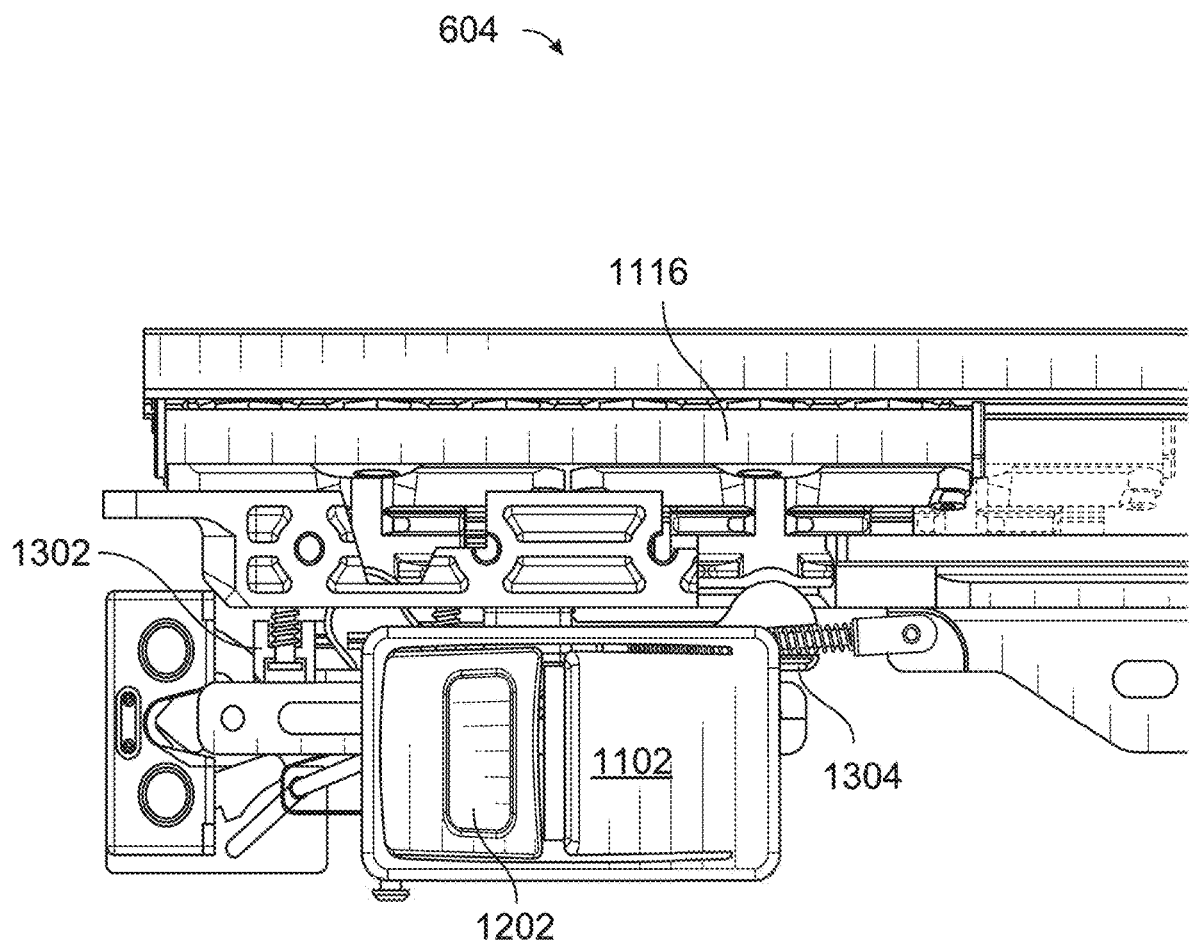
FIG. 13 is an exemplary schematic diagram illustrating a dual operation slide device having the slide ejection assembly deployed.

FIG. 13 is an exemplary schematic diagram illustrating a dual operation slide device 604 having the slide ejection assembly 1302 deployed. In this example, the release lever 1202 of the release lever 1102 has been actuated. The release lever remains open as a visual indication of deployment. The fuse slider 1304 has dropped down releasing the T-slider(s) of the carriage device 1116 from the carriage station. The trigger pin remains in the secondary position within the pin guide.

Figure 14:
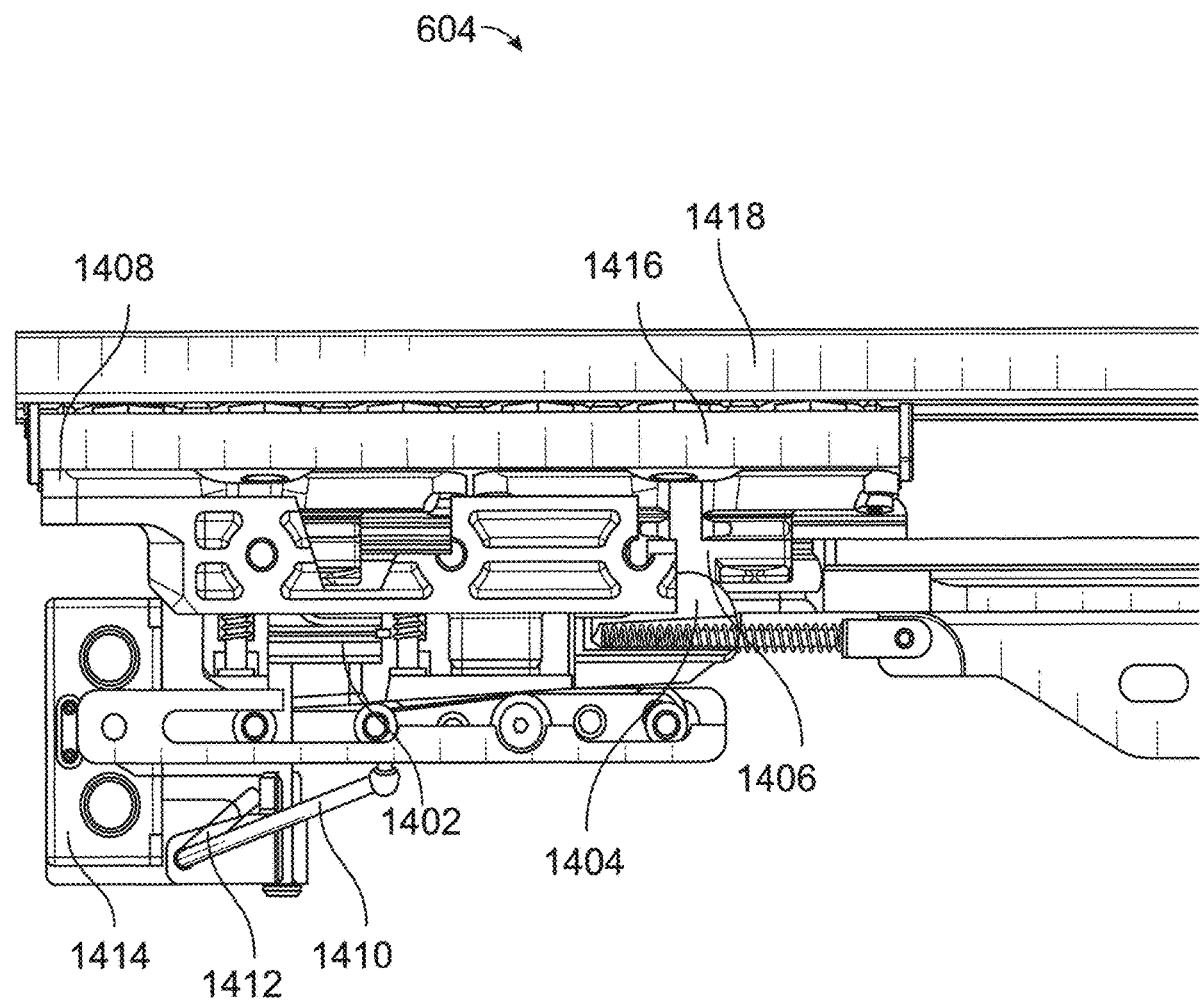
FIG. 14 is an exemplary schematic diagram illustrating a mechanical fuse assembly of the dual operation slide device in normal operation mode.

FIG. 14 is an exemplary schematic diagram illustrating a mechanical fuse assembly of the dual operation slide device 604 in normal operation mode. In this example, the mechanical fuse assembly 1402 includes a fuse slider 1404 pushing or otherwise locking a T-slide 1406 into place within the carriage station 1408. The trigger pin 1410 is in a first position at a bottom portion of a trigger pin slide 1412 within the pin guide 1414. The carriage device 1416 is locked within the carriage station and engaging the primary track 1418. In this example, the sliding door slides along the primary track in the normal operation mode. The backup operation mode has not been triggered in this example.

The dual operation slide device in this example does not include a release lever. Instead, the carriage lock assembly is triggered to release the carriage device from the carriage station by apply a threshold minimum amount of force on the sliding door in a direction towards the door support member. The applied force triggers the variant pin guide 1414 to move from the first position (shown in FIG. 14) to the second position, triggering the operation of the backup operation mode. In this non-limiting example, the applied force for activation of the backup operation mode is twenty-five pounds of push force applied to the door in the direction of the retracted position. However, the examples are not limited to that amount of force. The threshold force applied for activation of the backup mode can include any appropriate amount of force to trigger release of the carriage device from the stationary carriage station.

Figure 15:
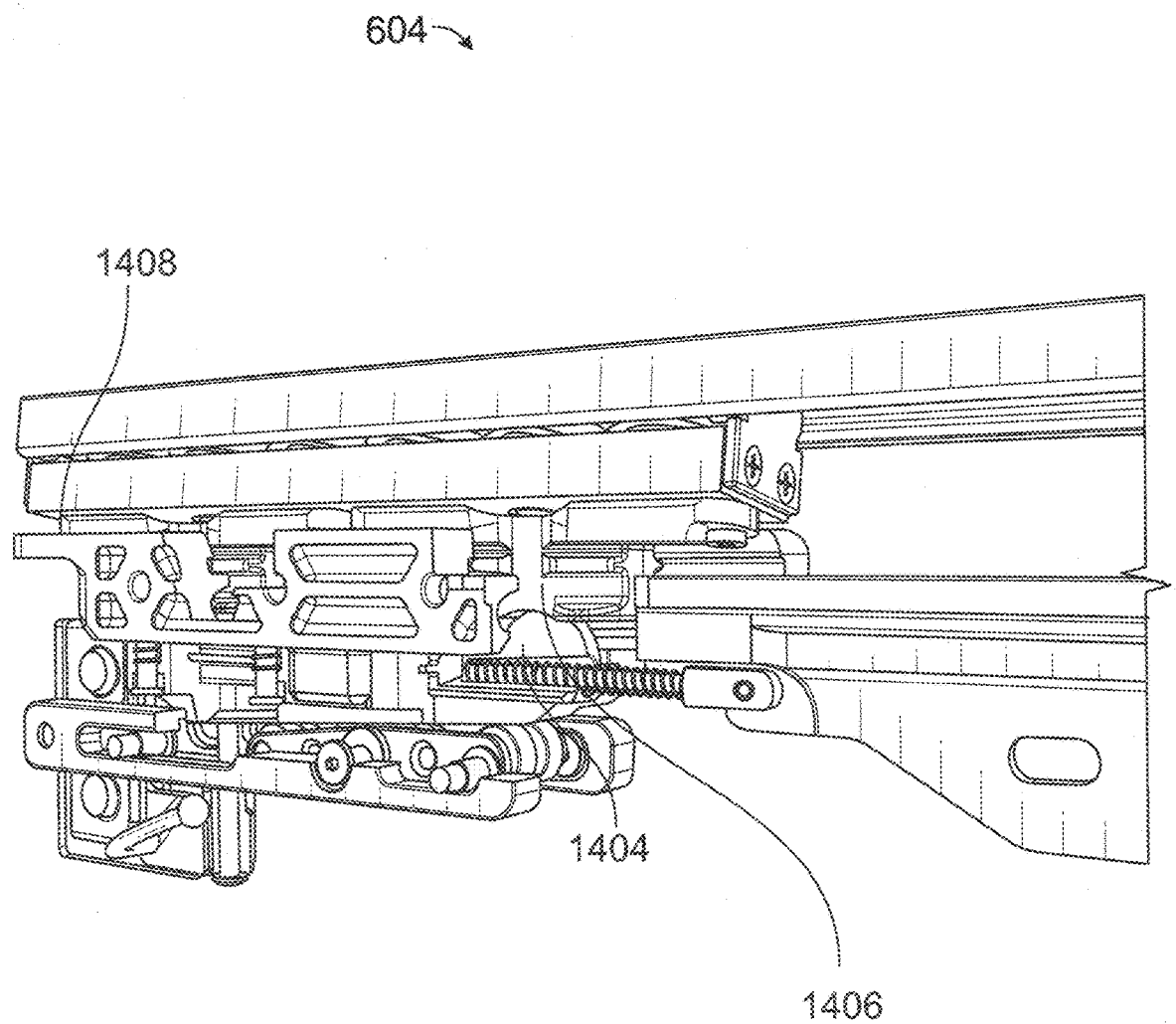
FIG. 15 is an exemplary schematic diagram illustrating a mechanical fuse assembly releasing a carriage device into a backup operation mode of the dual operation slide device.

FIG. 15 is an exemplary schematic diagram illustrating a mechanical fuse assembly releasing a carriage device into a backup operation mode of the dual operation slide device 604. In this example, portions of the carriage station are cut-away giving a cross-sectional view of the T-sliders within the carriage station. In this example, the dual operation slide device is still in the normal operation mode with the carriage device locked into the carriage station. The fuse slider 1404 is pushing or holding the T-slide 1406 in normal operation mode position within the carriage station 1408.

Figure 16:
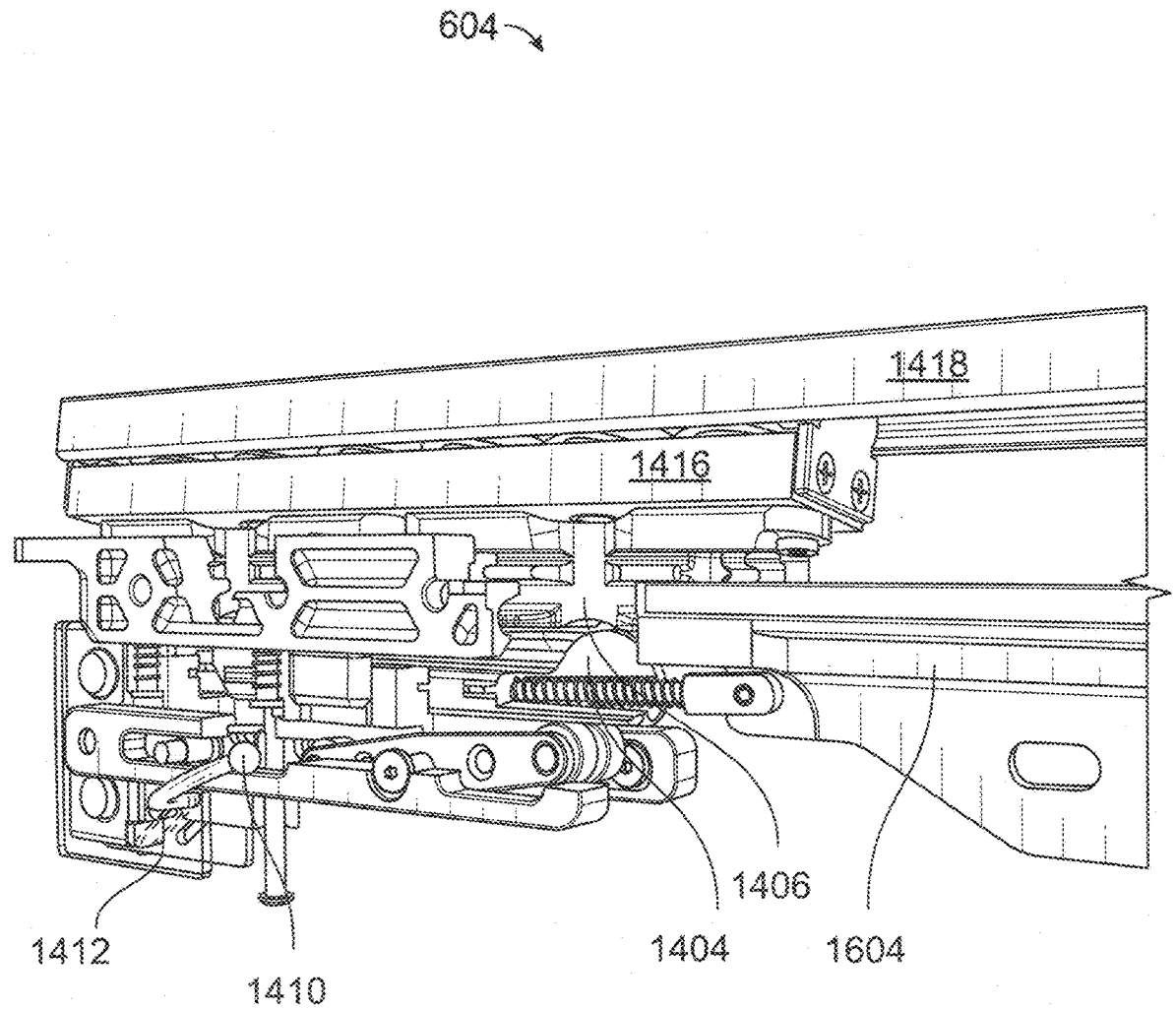
FIG. 16 is an exemplary schematic diagram illustrating force applied activation of a backup operation mode of the dual operation slide device.

FIG. 16 is an exemplary schematic diagram illustrating force applied activation of a backup operation mode of the dual operation slide device 604. In this example, the backup operation mode has been activated by a force applied activation. The trigger pin 1410 has moved upward into the second position within the trigger pin slide 1412. The movement towards the second position within the trigger pin slide activates a rotary latch. This releases and decouples the carriage lock 1012 allowing the fuse slider to drop free.

The fuse slider 1404 drops down releasing the T-slider 1406. The carriage device 1416 slides out of the carriage station and onto or into the secondary track 1604. As the carriage device slides out onto the secondary track, the carriage device remains removably coupled to the primary track 1418. As the user applies a push or pull force on the sliding door pushing the door towards the retracted position, the primary track 1418 engaging the carriage device moves with the carriage device T-sliders as the carriage device moves along the secondary tracks back to the retracted position.

Figure 17:
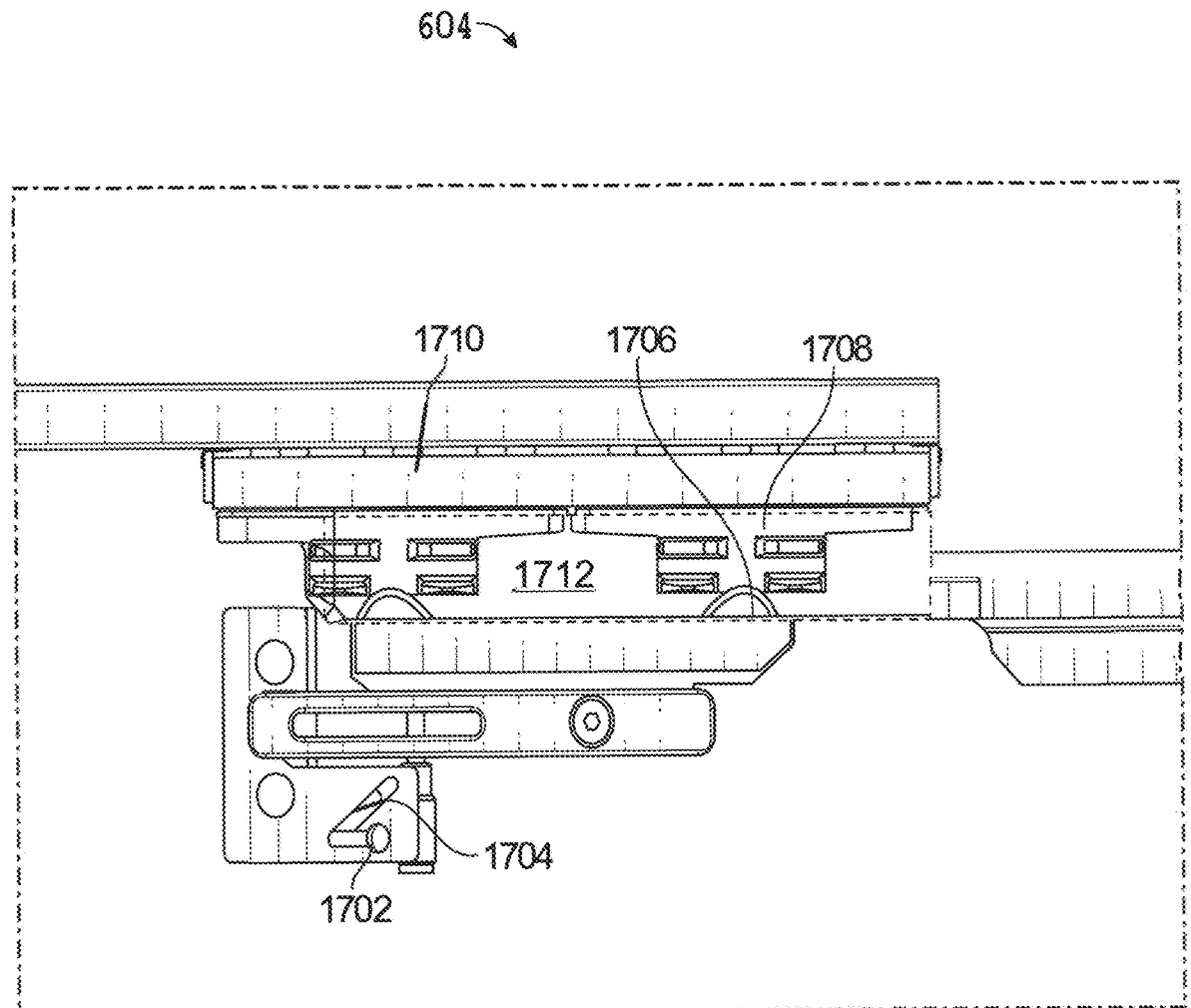
FIG. 17 is an exemplary schematic diagram illustrating a dual operation slide device having a primary track lock-up failure.

FIG. 17 is an exemplary schematic diagram illustrating a dual operation slide device 604 having a primary track lock-up failure. In this example, the primary track lock-up failure requires a pull force on the suite door not exceeding twenty-five pounds spring force per half inch of door travel to activate the backup operation mode. In other examples, activation of the backup operation mode is performed by manually actuating a release lever to release the carriage device from the carriage station 1712.

In this example, the dual operation slide device is still in the normal operation mode. The trigger pin 1702 is in the first position within the pin guide 1704. The fuse slider 1706 holds the T-slide 1708 of the carriage device 1710 in the locked configuration within the carriage station.

Figure 18:
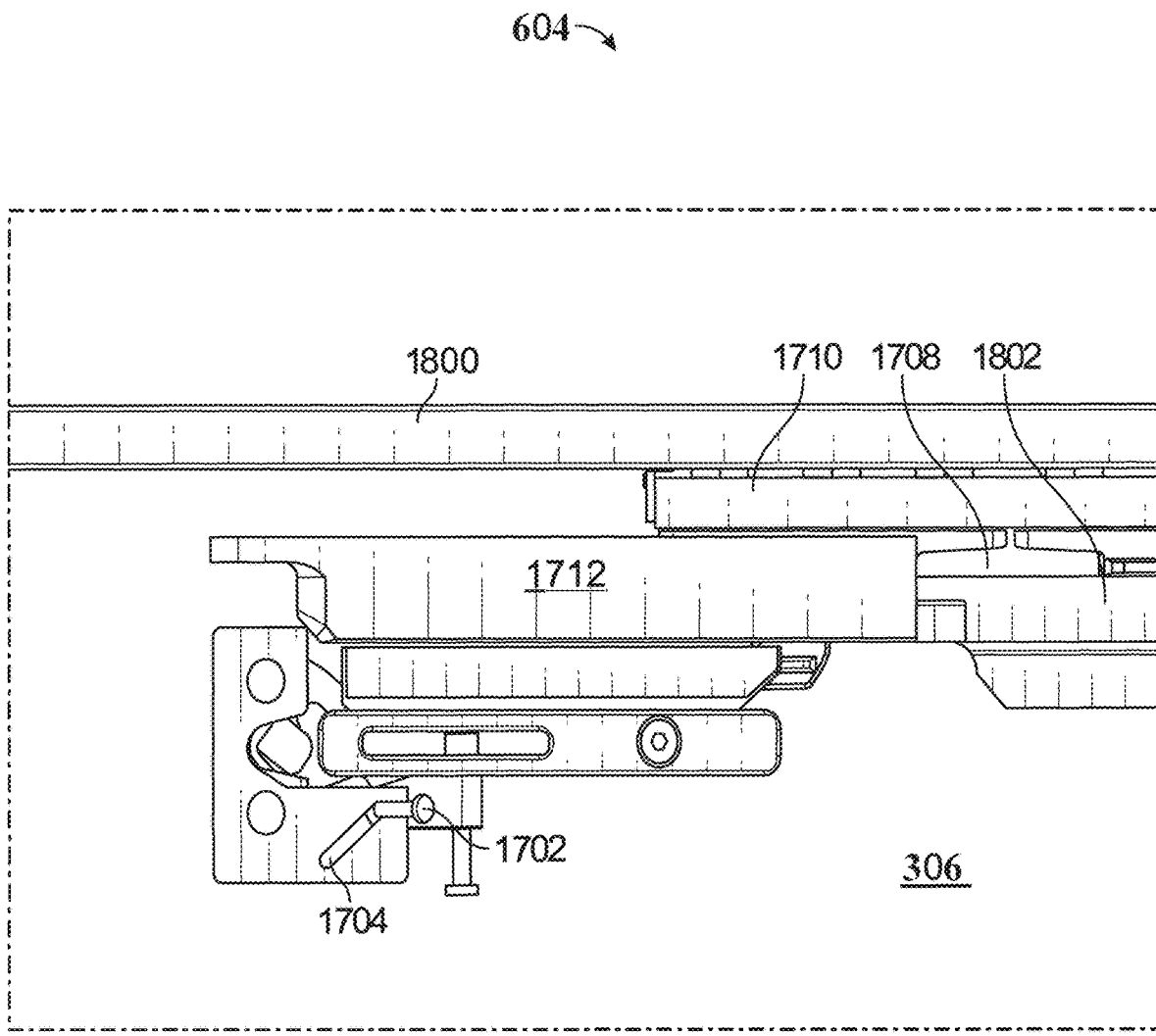
FIG. 18 is an exemplary schematic diagram illustrating a dual operation slide device switching from a normal operation mode to a backup operation mode.

FIG. 18 is an exemplary schematic diagram illustrating a dual operation slide device 604 switching from a normal operation mode to a backup operation mode. In this example, the trigger pin 1702 is in the second position within the pin guide 1704. The T-slide 1708 is free and the carriage device 1710 has moved onto the secondary track 1802. As the carriage device 1710 slides along the secondary track, the carriage device remains attached to the primary track mounted to the sliding door while the carriage station 1712 and carriage lock assembly remain stationary on the door support member 306.

Figure 19:
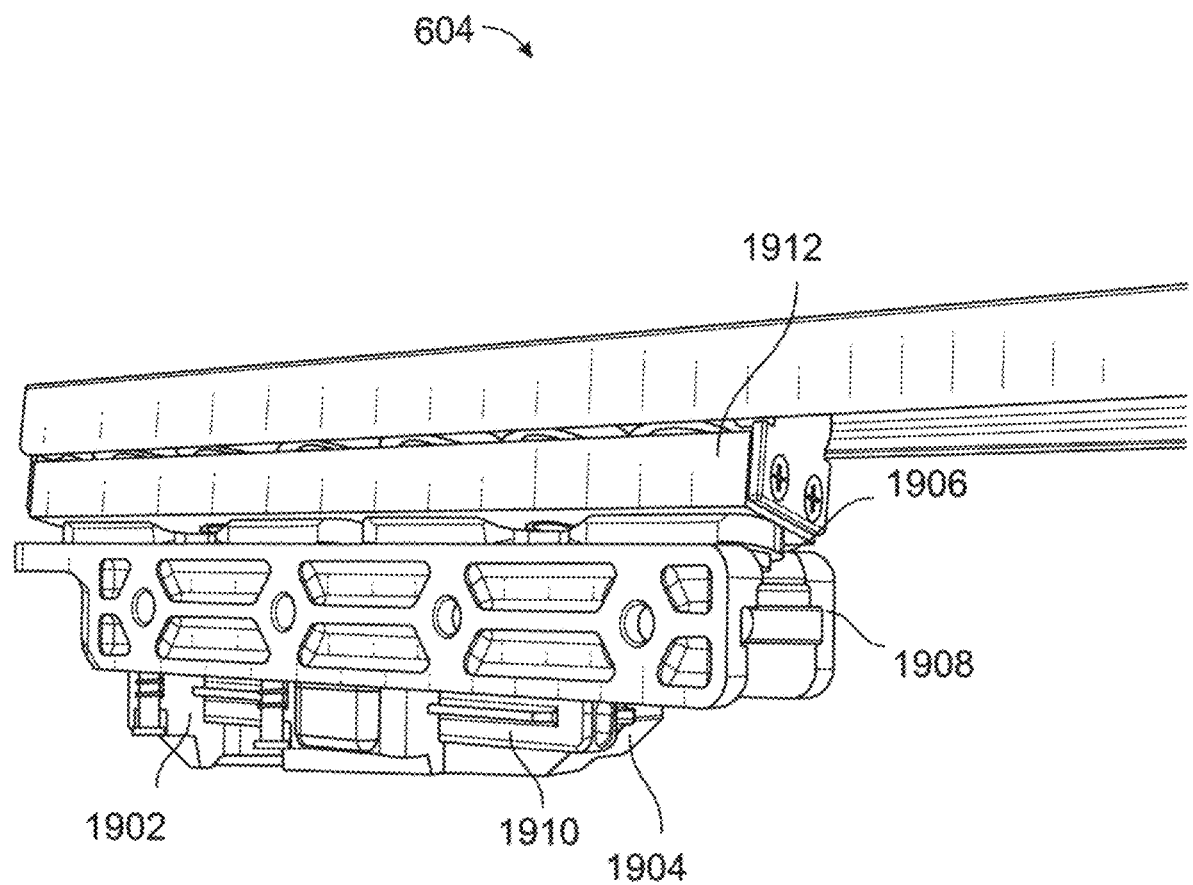
FIG. 19 is an exemplary schematic diagram illustrating a dual operation slide device including a mechanical fuse assembly having a tapered housing.

FIG. 19 is an exemplary schematic diagram illustrating a dual operation slide device 604 including a mechanical fuse assembly 1902 having a tapered housing 1904. A set of one or more T-slider(s) 1908 of the carriage device 1912 are locked within the carriage station by one or more fuse slider(s) 1910.

Figure 20:
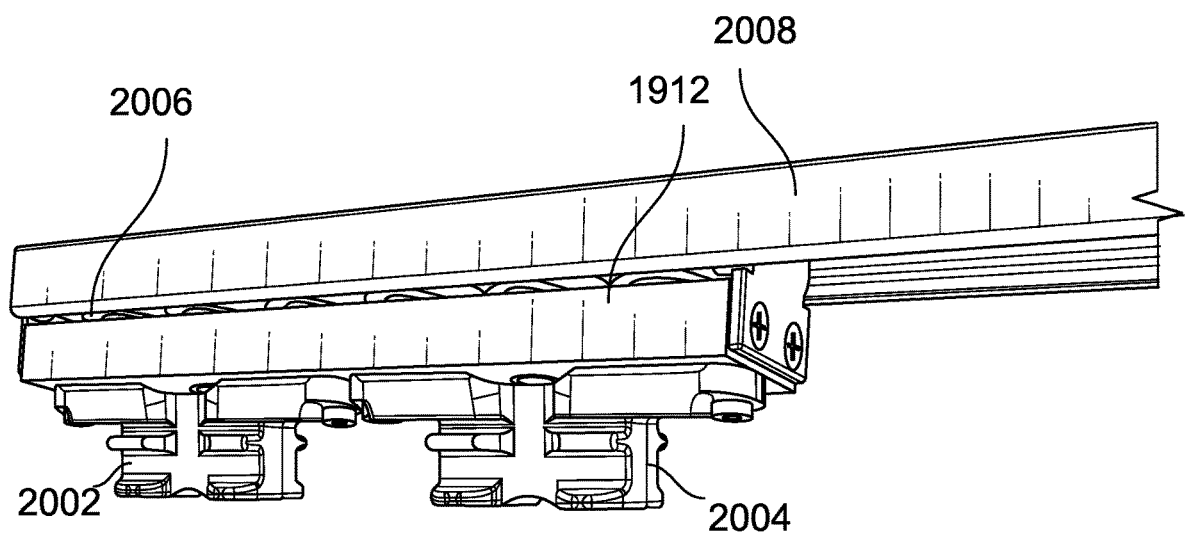
FIG. 20 is an exemplary schematic diagram illustrating a carriage device having a set of T-sliders.

FIG. 20 is an exemplary schematic diagram illustrating a carriage device 1912 having a set of T-sliders 1906. In this example, the set of T-sliders includes a first T-slider 2002 and a second T-slider 2004. The T-sliders are shaped and sized to engage the secondary track. In this example, a set of rollers 2006 are sized to engage the interior portion of the primary track 2008.

Figure 21:
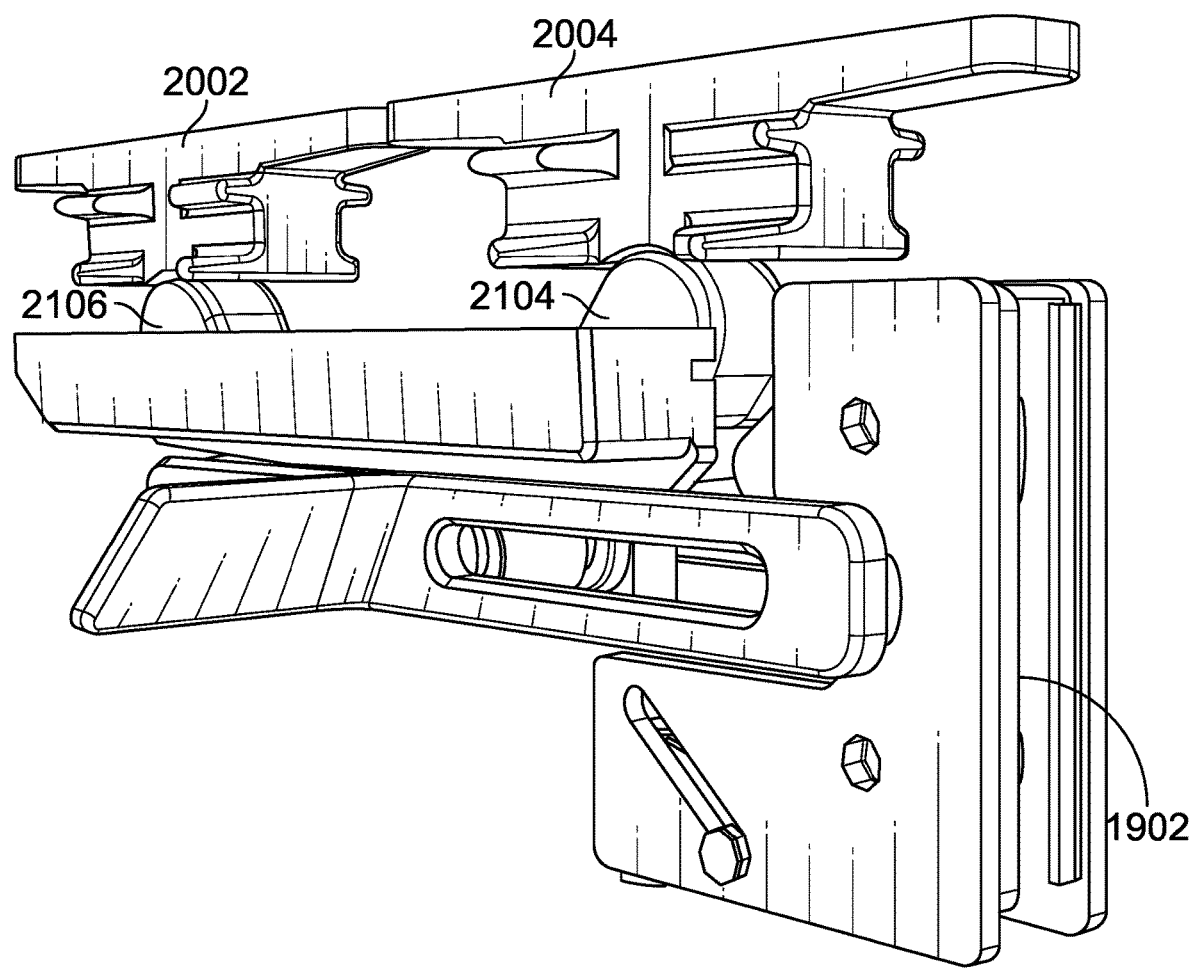
FIG. 21 is an exemplary schematic diagram illustrating a mechanical fuse assembly associated with a dual operation slide device.

FIG. 21 is an exemplary schematic diagram illustrating a mechanical fuse assembly 1902 associated with a dual operation slide device. In this example, a first end 2106 of a fuse slider engages a first T-slider 2002 and a second end 2104 of the fuse slider engages a second T-slider 2004 when the dual operation slide device is in the normal operation mode.

Figure 22:
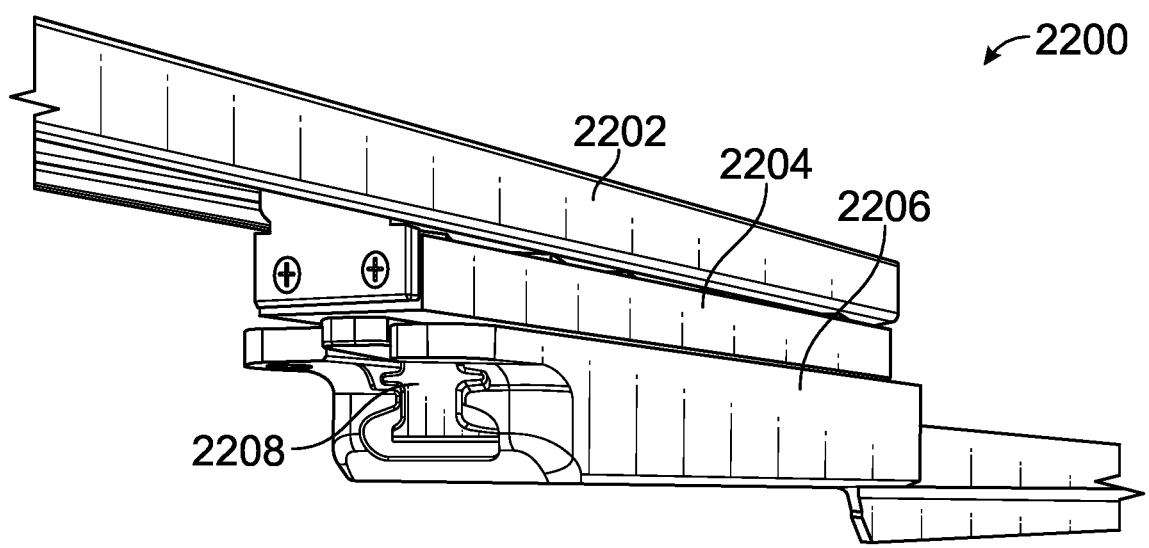
FIG. 22 is an exemplary schematic diagram illustrating a set of tracks associated with a dual operation slide device.

FIG. 22 is an exemplary schematic diagram illustrating a set of tracks 2200 associated with a dual operation slide device. In this example, the primary track 2202 engages the carriage device 2204. The carriage device 2204 removably couples to the secondary track 2206 in a backup operation mode. The T-slide(s) 2208 are configured to slide on or within the secondary track.

Figure 23:
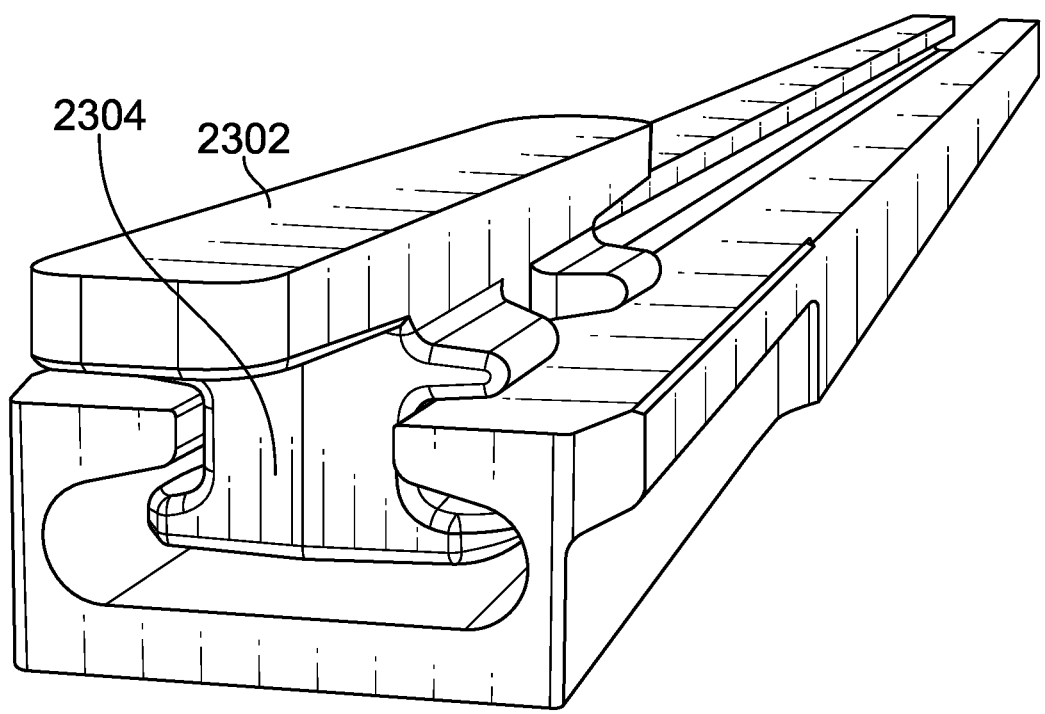
FIG. 23 is an exemplary schematic diagram illustrating a secondary track engaging a T-slide in a backup operation mode.

FIG. 23 is an exemplary schematic diagram illustrating a secondary track 2206 engaging a T-slide in a backup operation mode. A top portion 2302 of the T-slide in this example sits above the secondary track. A bottom portion 2304 sits within a cavity or space formed by the secondary track. The T-slides slide along the secondary track as the door is pushed from the fully deployed or partially deployed position back into the substantially fully retracted position.

Figure 24:
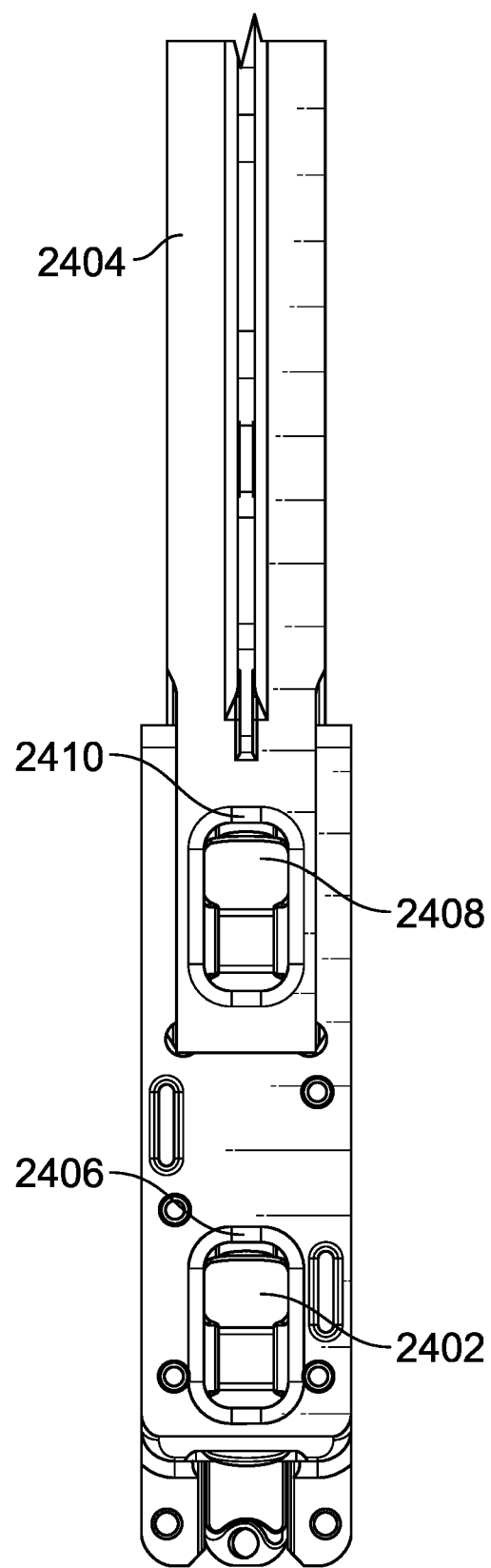
FIG. 24 is an exemplary schematic diagram illustrating a bottom view of a T-slide engaging a secondary track.
Figure 25:
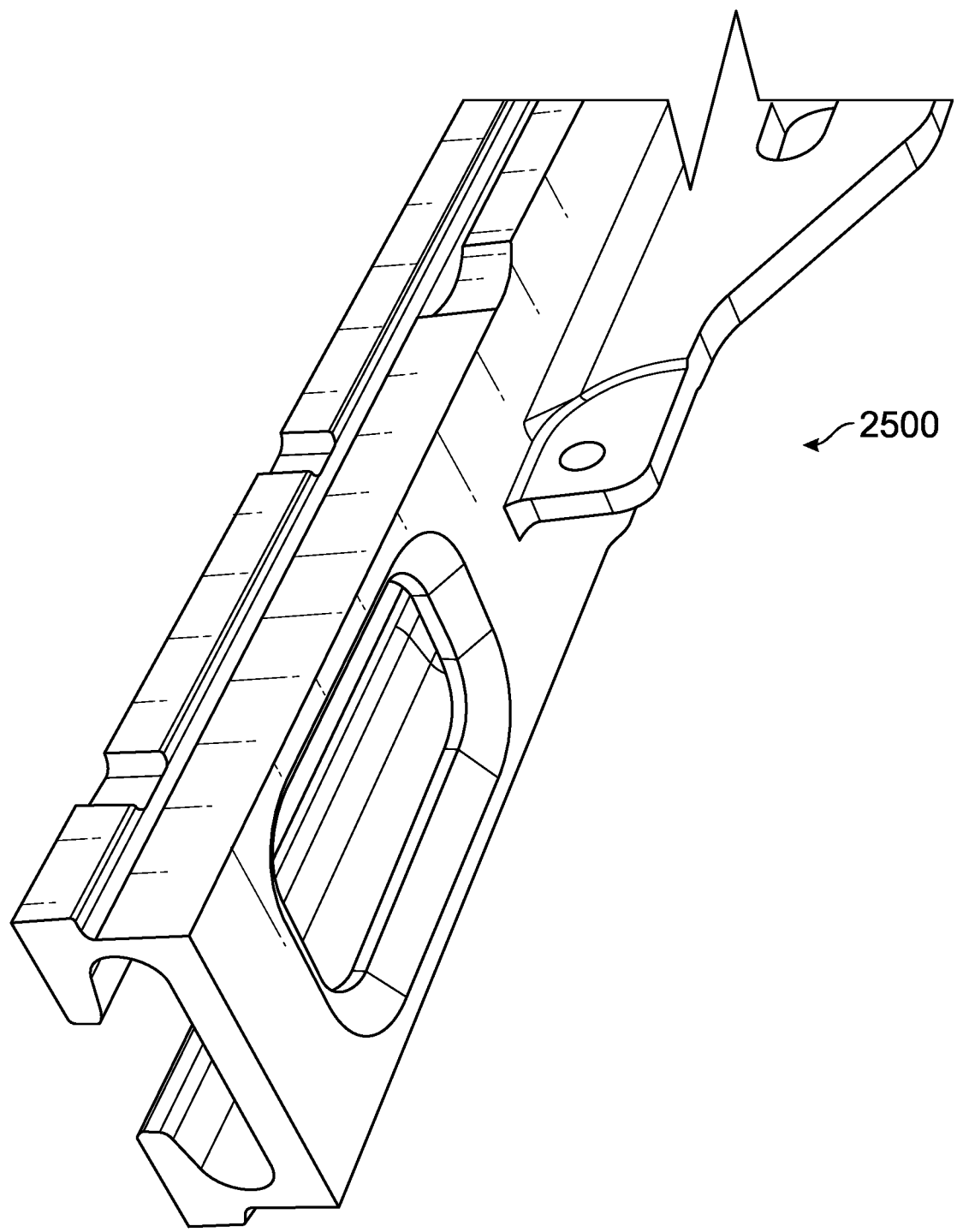
FIG. 25 is an exemplary schematic diagram illustrating a portion of a secondary track.

FIG. 24 is an exemplary schematic diagram illustrating a T-slide 2402 engaging a secondary track 2404. A portion of the T-slide 2402 can be seen through the T-slide aperture 2406. A portion of the T-slide 2408 can be seen through the T-slide aperture 2410. FIG. 25 is an exemplary schematic diagram illustrating a portion of a secondary track 2500. In this non-limiting example, the secondary track is a "C" track. The T-slide includes a C-track fitting sized to slide within the track without scraping or dragging.

Figure 26:
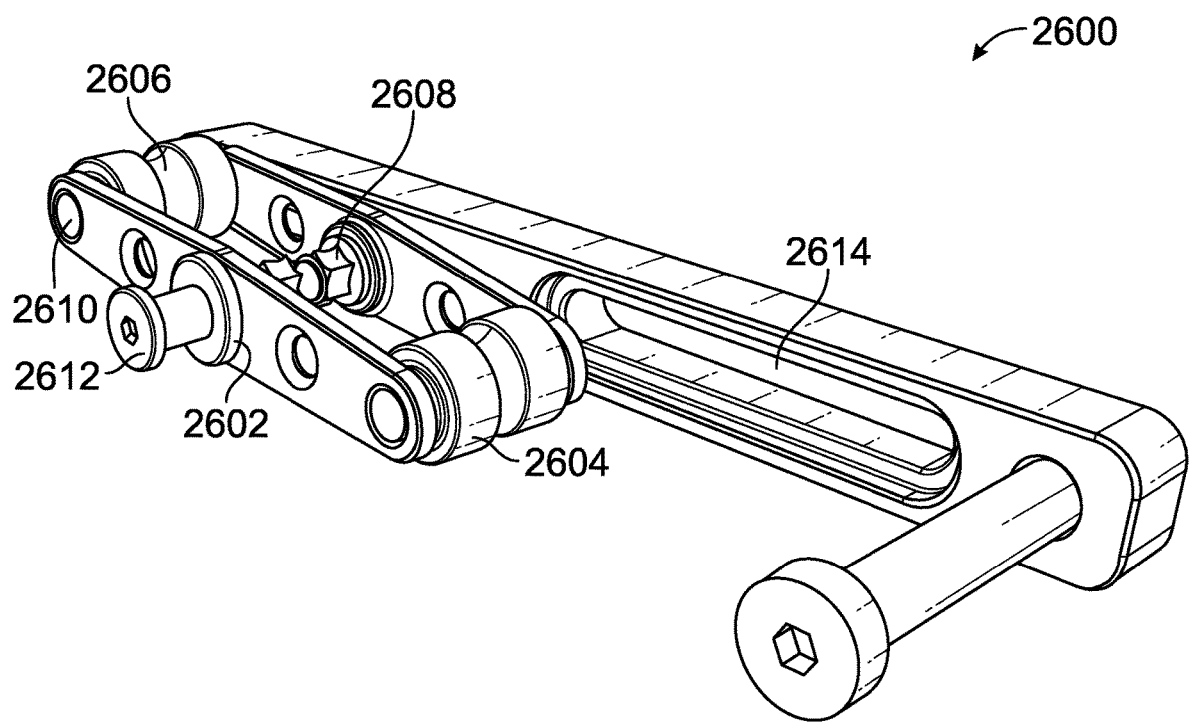
FIG. 26 is an exemplary schematic diagram illustrating a carriage lock assembly having a pivot roller sub-assembly.

FIG. 26 is an exemplary schematic diagram illustrating a carriage lock assembly 2600 having a pivot roller sub-assembly 2602. The pivot roller sub-assembly includes a set of rollers, such as roller 2604 and roller 2606. The pivot roller sub-assembly is attached to the slider arm 2614 via fastener(s) such as, a self-locking nut 2608, screw(s) 2610, and shoulder screw 2612.

Figure 27:
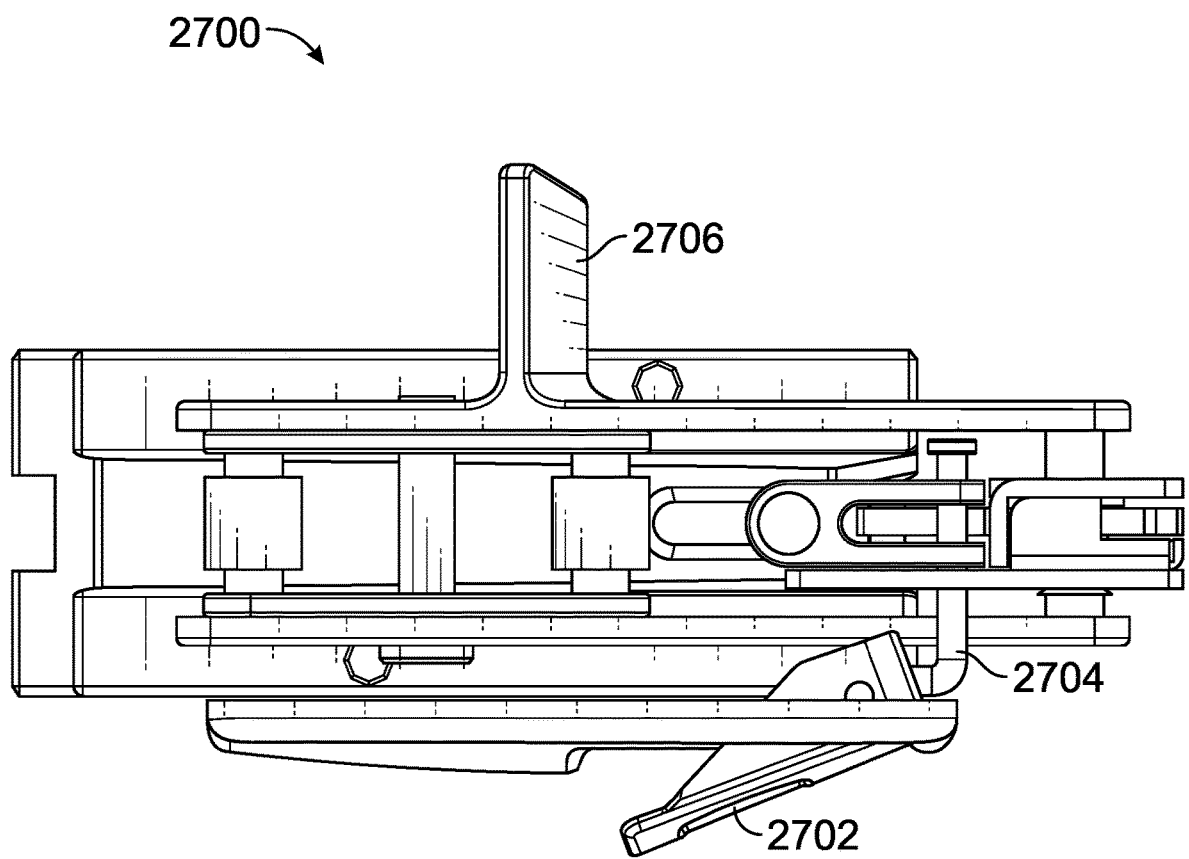
FIG. 27 is an exemplary schematic diagram illustrating an underside view of a carriage lock assembly triggered via a release lever.

FIG. 27 is an exemplary schematic diagram illustrating a carriage lock assembly 2700 triggered via a release lever 2702. In this example, the release lever 2702 has been pulled. The trigger pin 2704 moves into the second position the pin guide. This pushes the carriage lock assembly 2706 back and up along the tapered edge of the mechanical fuse assembly, lowering the fuse slider to release the carriage device. In some examples, a spring detent is released during reset to return the door to the primary track. The pivot roller/taper lock mechanism of the reset system secures the primary linear track (slide)/carriage station and relatch in a simplified process which can be performed by a single flight crew member in the event of erroneous activation of the backup operation mode.

Figure 28:
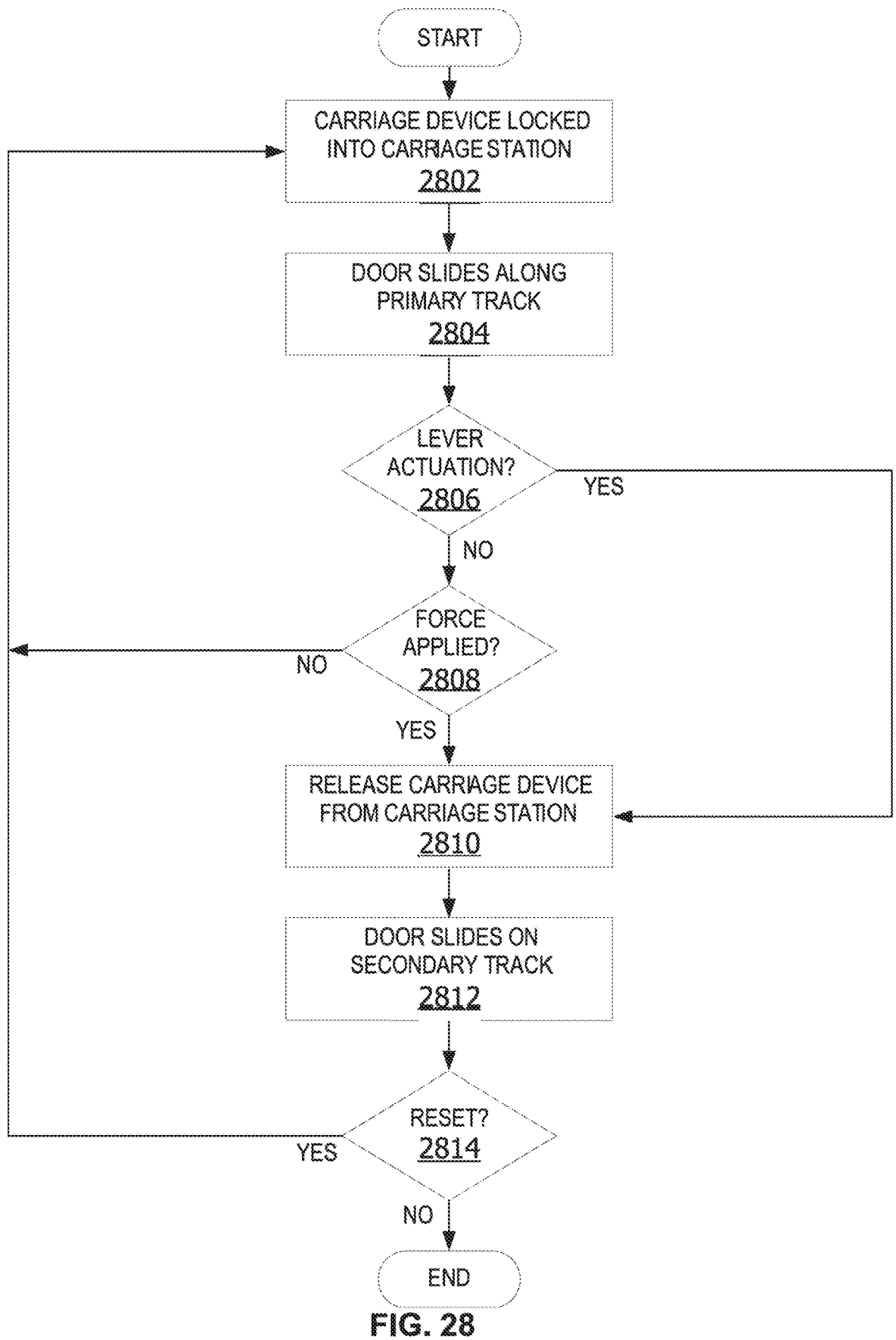
FIG. 28 is an exemplary flow chart illustrating operation of the dual operation slide device for switching from a normal operation mode to a backup operation mode of a sliding door.

FIG. 28 is an exemplary flow chart illustrating operation of the dual operation slide device for switching from a normal operation mode to a backup operation mode of a sliding door, such as the sliding door 104 in FIG. 4.

A carriage device is locked into a carriage station in the normal operation mode at 2802. The door slides along the primary track in the normal operation mode at 2804. If a release lever is actuated at 2806, the carriage device is released from the carriage station at 2810. The door slides on the secondary track in the backup operation mode.

If the latch is not actuated at 2806, the carriage device can also be released from the carriage station if a threshold force is applied to the dual operation slide device at 2808. After the carriage device is released from the carriage station 2810, the door slides on the secondary track at 2812. The user can reset the dual operation slide device by pushing the door back toward the deployed position. If the dual operation slide device is reset at 2814, the carriage device is locked back into the carriage station at 2802 and the door slides along the primary track again at 2804.

In some examples, the door is secured automatically when the door returns to the fully retracted position. In other examples, the door is secured by activating a locking device to hold the door in the retracted position. In other examples, an internal locking device clicks into place to hold the sliding door in place when the door is fully retracted. In still other examples, the door is secured by moving the door toward the retracted position without engaging any locks or other securing device. In this example, the door remains in the partially retracted or fully retracted position via inertia.

Figure 29:
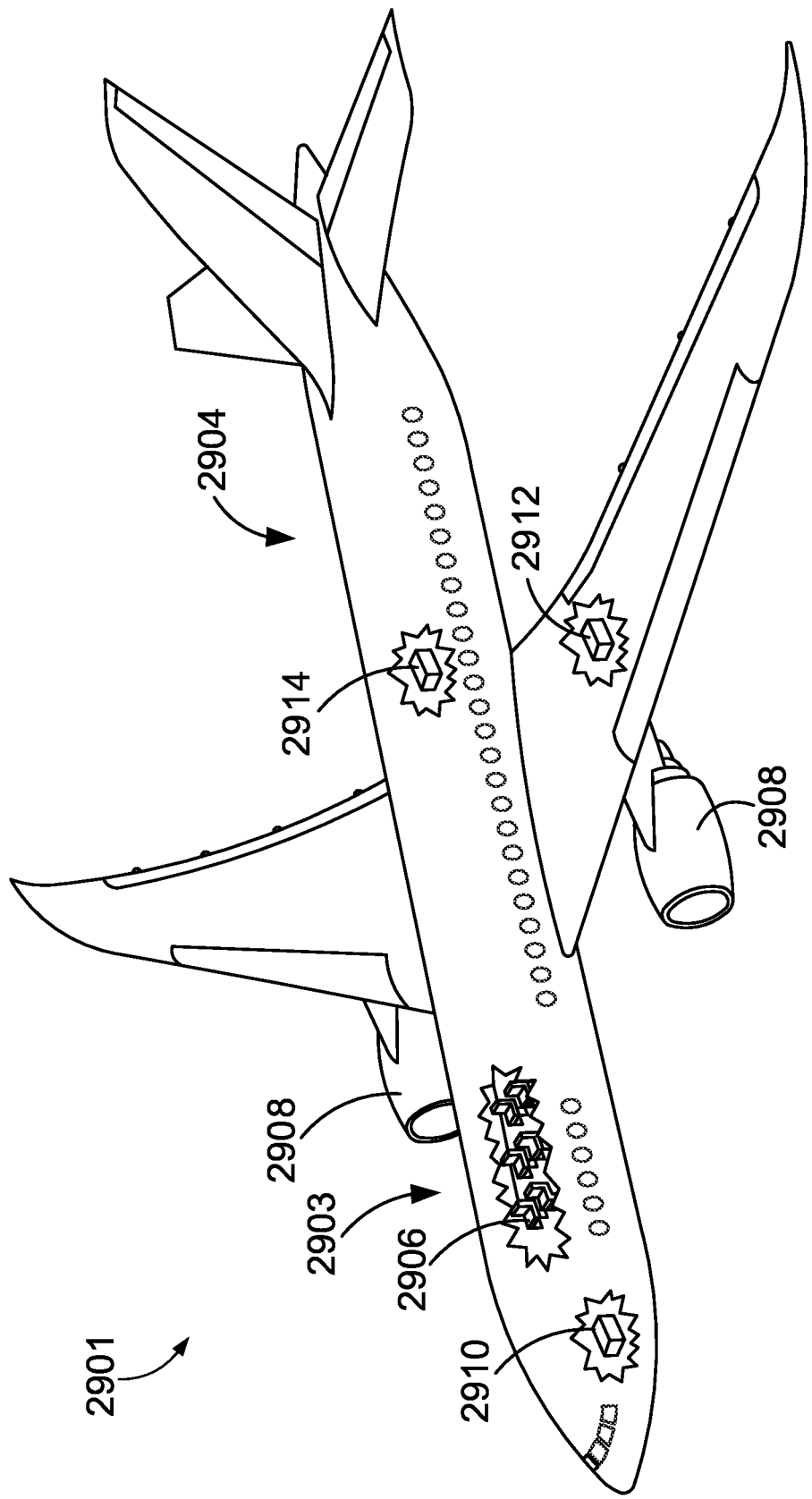
FIG. 29 is a schematic perspective view of a particular flying module.

With reference now to FIG. 29, a more specific diagram of the flying apparatus 2901 is depicted in which an implementation of the disclosure is advantageously employed. In this example, the flying apparatus 2901 includes an airframe 2903 with a plurality of systems 2904 and an interior 2906. In some examples, the flying apparatus 2901 is a vehicle, such as, but not limited to, the vehicle 106 in FIG. 1.

Implementations of the plurality of systems 2904 include one or more of a propulsion system 2908, an electrical system 2910, a hydraulic system 2912, and an environmental system 2914. The system may be implemented in the aircraft cabin within the aircraft. Other systems, not shown, are also candidates for inclusion. Although an aerospace example is shown, different advantageous implementations are applied to other industries, such as the automotive industry, etc.

Additional Examples

In some examples, the system includes a linear slide system mounted into a carriage station. The carriage station integrates the primary track [PES] and secondary track [EPF] systems but allows independent operation along the same axis. It provides containment for the primary linear carriages and isolation from the EPF slide system when locked, allowing priority to the primary slides for normal operation of the door. If the primary track fails, a linked trigger and release mechanism, allows deployment of the EPF by operation of a Pull lever or by a pull force exerted on the suite door not exceeding 25 pounds.

The integration of the backup operation mode EPF pull lever system with a preset pull force trigger on the door provides the same outcome irrespective of the method of user interaction with the EPF. Moreover, during stressful conditions or while operating unfamiliar equipment, a user's first instinct may not be to look for a physical lever. Instead, a user is likely to simply pull harder on an inoperable door. The dual operation slide device further simplifies the EPF reset especially in the case of erroneous deployment. It also provides a failsafe solution by means of the force trigger [mechanical fuse] should the primary slide performance degrade to the range where the backup operation mode is set to deploy.

In other examples, the decoupling lever is designed to lock 'OPEN' following deployment of the EPF secondary (backup operation mode) slide following either pulling of the EPF lever or by the door pull force trigger, providing a visible display of the EPF activation. The co-axial linear PES/EPF track system, carriage return station, taper lock and EPF latch design allows the dual operation slide system to be easily reset by a single user, in the event of erroneous activation by a suite occupant. Traverse of the suite door from 'EPF deployed OPEN' position toward the door 'CLOSED' position allows the linear slide carriages to re-engage and 'Lock Home' into the carriage station; the EPF lever to unlock then close, and for the EPF system to reset. A push force not exceeding 40 lb [tbc] applied to the door directed toward the door CLOSED position is considered appropriate for a single flight crew member to reset the EPF.

In an example scenario, when a door is jammed in a closed position, egress from a suite is prevented. A user has the option of locating and following instructions to evacuate the suite in an emergency. In some cases, a warning placard may be available with details of a procedure for unjamming the door positioned on the suite adjacent to the door. In one example, the instructions may include directions to pull a lever adjacent to the warning placard to deploy the EPF backup operation mode. The door opens allowing emergency egress from the suite. The lever is locked in the pulled state to provide a visual feedback that the EPF has been deployed.

In other examples, when a door is jammed, the user can pull harder on the door. By applying force to the jammed door not exceeding a maximum upper threshold, the EPF backup operation mode can be deployed. In this manner, the user can return the door to the retracted state.

In another example, if a sliding door is locked in a fully open position during a boarding situation, the crew can unlock the suite door. After unlocking, the passenger has full positional control to move the door between an open and closed position. The suite door sliding operation assisted by a door handle requires minimum force by a user to position the door between open and closed travel stations. The door functions normally with a magnetic catch to provide haptic feedback of contactless end travel.

In still other examples, the pull lever allows for maintenance testing of the EPF system. Performance degradation of the primary linear track can result in an increase of normal operation loads required by the door during normal use. When the pull force on the door reaches the preset value for EPF deployment the design provides a mechanical 'FUSE' where the break reports a fault with the system. In this manner, the dual operation slide device combines a EPF lever with discreet pull force to activate the backup operation mode (emergency passage feature). The dual operation slider system contains primary and secondary backup linear systems and provides separation/isolation of the EPF slide components from suite door abuse loads. Moreover, permitting a combination of EPF lever and/or discreet pull force triggers to activate the backup operation mode provides redundancy while simplifying system use for passengers and crew. In still other examples, the system enables a user to unlock a jammed door using the backup operation mode and then easily reset the system back to the primary track system using a push or pull force applied to the door.

The following paragraphs describe further aspects of the disclosure. In some implementations, the paragraphs described below can be further combined in any sub-combination without departing from the scope of the present disclosure.

1A. A dual-operation sliding door assembly comprising:
   a sliding door associated with a seat unit, the sliding door mounted on a door support member of the seat unit;
   a dual operation slide device at least partially disposed within a door support member of the seat unit;
   a primary track of the sliding door engaging the dual operation slide device, wherein the sliding door is movable along the primary track between a retracted position and at least one deployed position in a normal operation mode, the dual operation slide device further comprising:
      an immovable carriage station at least partially disposed within the door support member that locks a carriage device into the immovable carriage station, wherein the primary track slides over the carriage device in the normal operation mode;
      a secondary track associated with the door support member, wherein the carriage device is unlocked from the immovable carriage station in a backup operation mode permitting the carriage device to slide along the secondary track between the at least one deployed position and the retracted position;
a release lever that triggers release of the carriage device from the immovable carriage station in an actuated state; and
a mechanical fuse assembly that triggers automatic release of the carriage device from the carriage station in response to a threshold force applied to a back of the sliding door in a direction of the door support member.

2A. The door assembly of claim 1, further comprising:
a reset mechanism that relocks the carriage device back into the carriage station.

3A. The door assembly of claim 1, further comprising:
a linked trigger and release mechanism that enables simultaneous triggering of the backup operation mode while releasing the carriage device from the carriage station.

4A. The door assembly of claim 1, further comprising:
a set of rollers associated with the carriage device, wherein the set of rollers engages the primary track.

5A. The door assembly of claim 1, further comprising:
a trigger pin disposed within a pin guide, wherein the trigger pin sits in a first position within the pin guide during normal operation mode, and wherein the trigger pin moves from the first position into the second position to release of the carriage device from the carriage station and trigger the backup operation mode.

6A. The door assembly of claim 1, further comprising:
a fuse slider associated with a mechanical fuse assembly, wherein the fuse slider locks a set of T-slides associated with the carriage device into a locked position within the carriage station during a normal operation mode.

7A. The door assembly of claim 6, further comprising:
a release latch of a release lever, wherein the release latch remains in a pulled configuration after manual actuation of the release lever providing a visual indicator that the dual operation slide device has been switched from the normal operation mode to the backup operation mode.

8A. A method for disengaging a sliding door of a door assembly, the method comprising:
locking a carriage device into a carriage station via a carriage lock assembly of a dual operation slide device associated with a sliding door movably mounted to a primary track, wherein the sliding door is movable along the primary track between a fully retracted position and at least one deployed position in a normal operation mode via the carriage device at least partially disposed within the primary track;
detecting an actuation of a release lever or a threshold force activation applied on a mechanical fuse assembly in a direction of the door support member;
releasing the carriage device from the carriage station to a secondary track in a backup operation mode via a dual operation slide device disposed within a door support member in response to the actuation of the release lever or the threshold force applied actuation, wherein the released carriage device is movable along the secondary track from the at least one deployed position to the fully retracted position.

9A. The method of claim 8, further comprising:
detecting a threshold force applied on the sliding door in a direction away from the door support member; and
resetting the carriage device back into the carriage station returning the dual operation slide device to the normal operation mode associated with the primary track.

10A. The method of claim 8, wherein the actuation of the release lever further comprises:
triggering a carriage release mechanism to release the carriage device from the carriage station in response to actuation of a release lever.

11A. The method of claim 8, wherein the threshold force applied activation further comprises:
applying the threshold force applied to a slider fuse associated with a mechanical fuse assembly of an automatic release mechanism, wherein the slider fuse lowers to release at least one T-slider from the carriage station permitting the carriage device to slide onto the secondary track.

12A. The method of claim 8, wherein a set of rollers associated with the carriage device engages the primary track.

13A. A system for a dual operation sliding door of a door assembly, the system comprising:
a door support member of a seat unit;
a primary track system comprising a first track engaging a set of rollers associated with a carriage device;
a sliding door associated with the first track, wherein the sliding door is movable along the primary track between a retracted position and at least one deployed position in a normal operation mode;
a carriage device at least partially disposed within the primary track;
a carriage lock assembly locking the carriage device to a carriage station mounted on a door support member;
a secondary track system comprising a second track engaging a set of T-slides associated with the carriage device during a backup operation mode; and
a dual operation slide device disposed within a door support member that automatically releases the carriage device from the carriage station onto the second track in the backup operation mode, wherein the carriage device is movable along the second track from the at least one deployed position to the retracted position in the backup operation mode.

14A. The system of claim 13, further comprising:
a reset mechanism that relocks the carriage device back into the carriage station.

15A. The system of claim 13, further comprising:
a linked trigger and release mechanism that enables simultaneous triggering of the backup operation mode while releasing the carriage device from the carriage station.

16A. The system of claim 13, wherein the dual operation slide device comprises:
a release lever that triggers release of the carriage device from the carriage station in response to actuation of a release lever.

17A. The system of claim 13, further comprising:
a mechanical fuse assembly that triggers release of the carriage device from the carriage station in response to a threshold force applied to a back of the sliding door in a direction of the door support member.

18A. The system of claim 13, further comprising:
a trigger pin disposed within a pin guide, wherein the trigger pin sits in a first position within the pin guide during normal operation mode, and wherein the trigger pin moves from the first position into the second position to release of the carriage device from the carriage station and trigger the backup operation mode.

19A. The system of claim 13, further comprising:
a fuse slider associated with a mechanical fuse assembly, wherein the fuse slider locks a set of T-slides associated with the carriage device into a locked position within the carriage station during a normal operation mode.

20A. The system of claim 13, further comprising:
a release latch of a release lever, wherein the release latch remains in a pulled configuration after manual actuation of the release lever providing a visual indicator that the dual operation slide device has been switched from the normal operation mode to the backup operation mode.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A door assembly for a seat unit, comprising:
a door support member;
a sliding door having a primary track, the sliding door mounted on the door support member for movement along the primary track between a retracted position and at least one deployed position in a normal operation mode;
a dual operation slide device at least partially disposed within the door support member for engagement by the primary track, the dual operation slide device including:
a carriage device slidably connected to the primary track to enable lateral movement of the sliding door in the normal operation mode;
a carriage station locked to the carriage device when the sliding door is in the normal operation mode;
a mechanical fuse assembly that triggers automatic release of the carriage device from the carriage station in response to a threshold force applied to the sliding door in a direction of the door support member in a backup operation mode; and
a linked trigger and release mechanism that enables simultaneous triggering of the backup operation mode while releasing the carriage device from the carriage station; and
a secondary track for receiving the carriage device released from the carriage station in the backup operation mode, wherein the carriage device switches from connection with the primary track in the normal operation mode to slidable engagement with the secondary track in the backup operation mode, the carriage device moves between the at least one deployed position and the retracted position when the carriage device is unlocked from the carriage station in the backup operation mode.

2. The door assembly for a seat unit of claim 1, further comprising a reset mechanism that relocks the carriage device into the carriage station.

3. The door assembly for a seat unit of claim 1, wherein the dual operation slide device further comprises a release lever that triggers release of the carriage device from the carriage station in an actuated state of the release lever.

4. The door assembly for a seat unit of claim 1, further comprising a trigger pin that sits in a first position within a pin guide during the normal operation mode, and moves from the first position into a second position to release the carriage device from the carriage station to trigger the backup operation mode.

5. The door assembly for a seat unit of claim 1, wherein a fuse slider of the mechanical fuse assembly moves in response to the threshold force to free a T-slide of the carriage device from engagement with the carriage station.

6. The door assembly for a seat unit of claim 1, wherein the primary track is located behind a top portion of the sliding door, the top portion curled over part of the primary track.

7. A door assembly for a seat unit, comprising:
a door support member;
a sliding door mounted on the door support member for movement along a primary track between a retracted position and at least one deployed position in a normal operation mode;
a secondary track upon which the sliding door moves in a backup operation mode; and
a dual operation slide device that automatically releases a carriage device from a carriage station onto the secondary track in the backup operation mode, the dual operation slide device including:
the carriage device slidably connected to the primary track to enable lateral movement of the sliding door in the normal operation mode, wherein the carriage device switches from connection with the primary track in the normal operation mode to slidable engagement with the secondary track in the backup operation mode such that the carriage device is movable along the secondary track from the at least one deployed position to the retracted position in the backup operation mode, wherein the carriage station is locked to the carriage device in the normal operation mode; and
a release lever that triggers release of the carriage device from the carriage station in an actuated state of the release lever.

8. The door assembly for a seat unit of claim 7, wherein the dual operation slide device further comprises a mechanical fuse assembly that triggers automatic release of the carriage device from the carriage station in response to a threshold force applied to the sliding door.

9. The door assembly for a seat unit of claim 8, wherein a fuse slider of the mechanical fuse assembly moves in response to the threshold force to free a T-slide of the carriage device from engagement with the carriage station.

10. The door assembly for a seat unit of claim 7, further comprising a reset mechanism that relocks the carriage device into the carriage station.

11. The door assembly for a seat unit of claim 7, further comprising a linked trigger and release mechanism that enables simultaneous triggering of the backup operation mode while releasing the carriage device from the carriage station.

12. The door assembly for a seat unit of claim 7, further comprising a trigger pin that sits in a first position within a pin guide during the normal operation mode, and moves from the first position into a second position to release the carriage device from the carriage station to trigger the backup operation mode.

13. The door assembly for a seat unit of claim 7, wherein the carriage device moves between the at least one deployed position and the retracted position when the carriage device is unlocked from the carriage station in the backup operation mode.

14. The door assembly for a seat unit of claim 7, wherein the primary track is located behind a top portion of the sliding door, the top portion curled over part of the primary track.

15. A door assembly for a seat unit, comprising:
a sliding door mounted for movement along a primary track between a retracted position and at least one deployed position in a normal operation mode;
a secondary track upon which the sliding door moves in a backup operation mode; and
a dual operation slide device that automatically releases a carriage device from a carriage station onto the secondary track in the backup operation mode, the dual operation slide device including:
the carriage device slidably connected to the primary track to enable lateral movement of the sliding door in the normal operation mode, wherein the carriage device switches from connection with the primary track in the normal operation mode to slidable engagement with the secondary track in the backup operation mode such that the carriage device is movable along the secondary track from the at least one deployed position to the retracted position in the backup operation mode, wherein the carriage station is locked to the carriage device in the normal operation mode; and
a mechanical fuse assembly that triggers automatic release of the carriage device from the carriage station in response to a threshold force applied to the sliding door, such that a fuse slider of the mechanical fuse assembly moves in response to the threshold force to free a T-slide of the carriage device from engagement with the carriage station.

16. The door assembly for a seat unit of claim 15, further comprising a reset mechanism that relocks the carriage device into the carriage station.

17. The door assembly for a seat unit of claim 15, wherein the dual operation slide device further comprises a release lever that triggers release of the carriage device from the carriage station in an actuated state of the release lever.

18. The door assembly for a seat unit of claim 15, further comprising a linked trigger and release mechanism that enables simultaneous triggering of the backup operation mode while releasing the carriage device from the carriage station.

19. The door assembly for a seat unit of claim 15, further comprising a trigger pin that sits in a first position within a pin guide during the normal operation mode, and moves from the first position into a second position to release the carriage device from the carriage station to trigger the backup operation mode.

20. The door assembly for a seat unit of claim 15, wherein the carriage device moves between the at least one deployed position and the retracted position when the carriage device is unlocked from the carriage station in the backup operation mode.

* * * * *